(12) United States Patent
Kangas et al.

(10) Patent No.: US 12,551,167 B2
(45) Date of Patent: Feb. 17, 2026

(54) TECHNIQUES FOR ADAPTIVE SENSORS OF A WEARABLE DEVICE

(71) Applicant: Oura Health Oy, Oulu (FI)

(72) Inventors: Mika Petteri Kangas, Oulu (FI);
Jukka-Tapani Mäkinen, Oulu (FI);
Olli Petteri Heikkinen, Oulu (FI);
Jaakko Tapio Vartiainen, Oulu (FI);
Kirsi Marja Maansaari, Oulu (FI)

(73) Assignee: Oura Health Oy, Oulu (FI)

( * ) Notice: Subject to any disclaimer, the term of this patent is extended or adjusted under 35 U.S.C. 154(b) by 623 days.

(21) Appl. No.: 17/966,642

(22) Filed: Oct. 14, 2022

(65) Prior Publication Data

US 2024/0122548 A1 Apr. 18, 2024

(51) Int. Cl.
*A61B 5/00* (2006.01)
*A61B 5/0205* (2006.01)
*A61B 5/026* (2006.01)
*H04B 10/07* (2013.01)

(52) U.S. Cl.
CPC ........ *A61B 5/7221* (2013.01); *A61B 5/02055* (2013.01); *A61B 5/0261* (2013.01); *A61B 5/6826* (2013.01); *A61B 5/6843* (2013.01); *H04B 10/07* (2013.01); *A61B 2562/0219* (2013.01); *A61B 2562/0238* (2013.01)

(58) Field of Classification Search
CPC .............. A61B 5/7221; A61B 5/02055; A61B 5/0261; A61B 5/6826; A61B 5/6843; A61B 2562/0219; A61B 2562/0238; A61B 5/02433; A61B 5/14551; A61B 2560/0209; A61B 5/681; H04B 10/07; H04B 10/114
See application file for complete search history.

(56) References Cited

U.S. PATENT DOCUMENTS

2015/0173631 A1\* 6/2015 Richards .............. A61B 5/7282
600/479
2015/0190078 A1\* 7/2015 Lisogurski ........... A61B 5/7225
600/324

\* cited by examiner

*Primary Examiner* — Eugene T Wu
(74) *Attorney, Agent, or Firm* — Holland & Hart LLP

(57) ABSTRACT

Methods, systems, and devices for adaptive sensors are described. A system may acquire physiological data from a user via multiple optical channels of a wearable device, where each optical channel includes a light-emitting component and a photodetector. The system may determine respective measurement quality metrics and respective power consumption metrics associated with each optical channel based on the physiological data. Additionally, the system may select one or more optical channels of the multiple optical channels of the wearable device based on a comparison of the respective measurement quality metrics and the respective power consumption metrics associated with each optical channel. The system may acquire additional physiological data using the one or more optical channels based on the selecting.

17 Claims, 10 Drawing Sheets

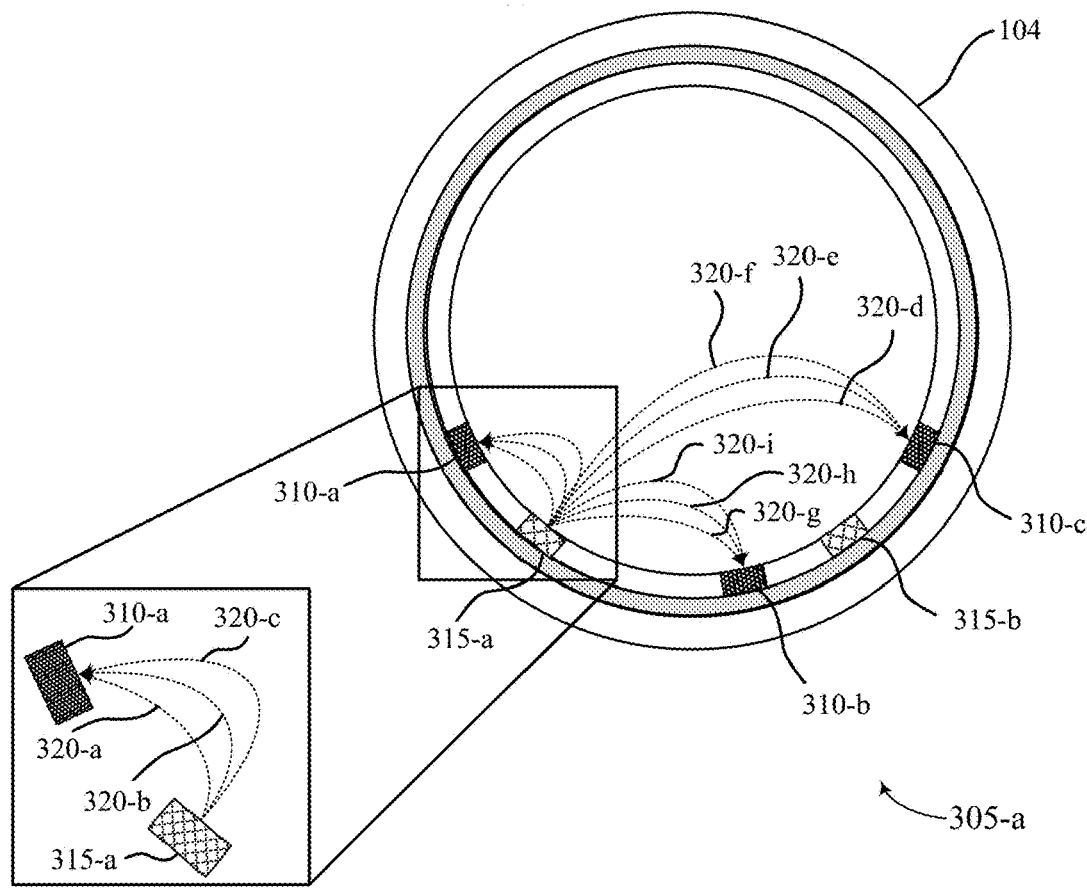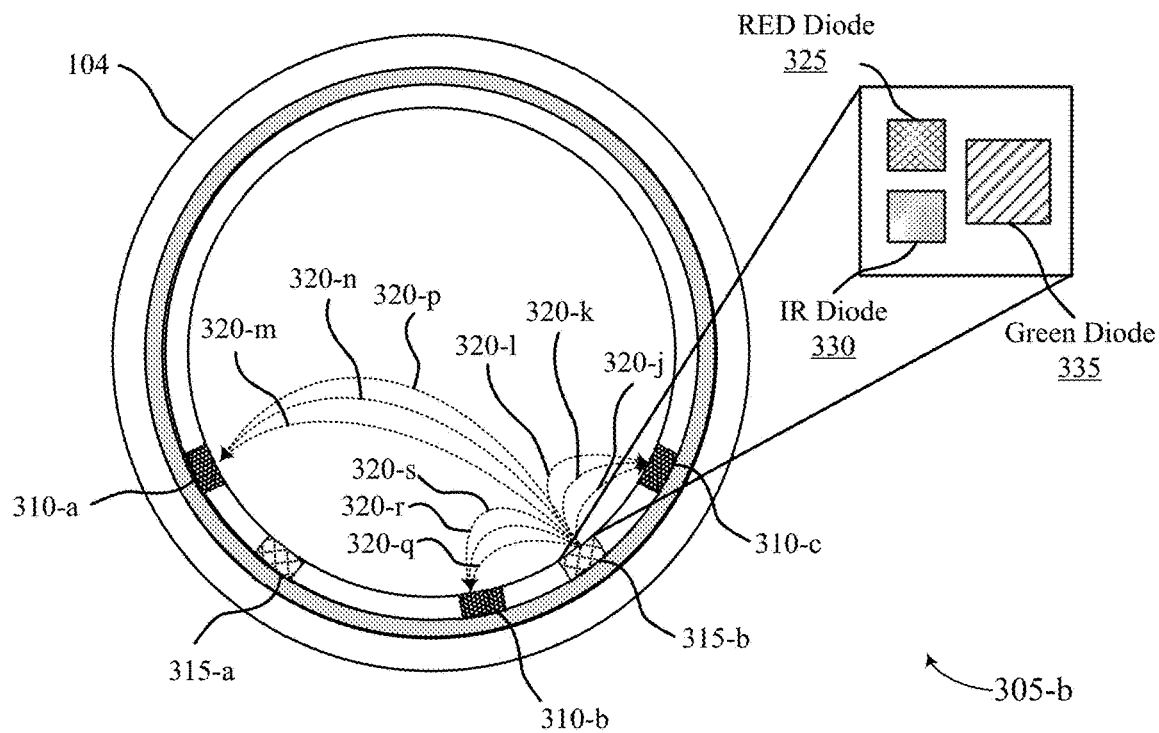
FIG. 3

TECHNIQUES FOR ADAPTIVE SENSORS OF A WEARABLE DEVICE

FIELD OF TECHNOLOGY

The following relates to wearable devices and data processing, including techniques for adaptive sensors of a wearable device.

BACKGROUND

Some wearable devices may be configured to collect data from users. For example, a wearable device may include one or more sensors that collect physiological data from a user. Some systems associated with the wearable devices may also be able to perform various actions, such as providing certain health insights to users.

BRIEF DESCRIPTION OF THE DRAWINGS

FIG. 3 illustrates an example of a wearable device that supports techniques for adaptive sensors of a wearable device in accordance with aspects of the present disclosure.

DETAILED DESCRIPTION

Figure 1:
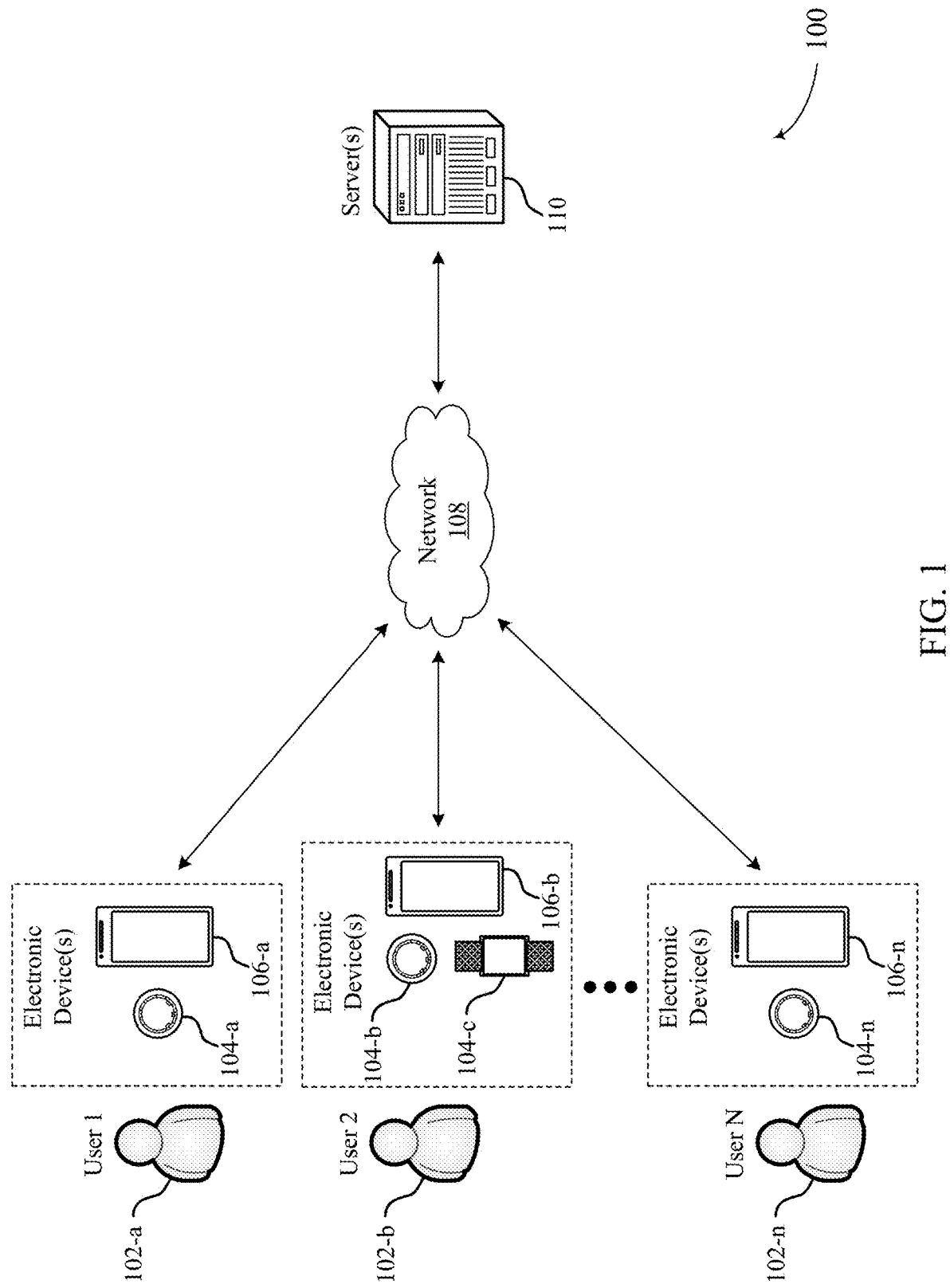
FIG. 1 illustrates an example of a system that supports techniques for adaptive sensors of a wearable device in accordance with aspects of the present disclosure.

Wearable devices, such as a wearable ring device, may be used to collect, monitor, and track physiological data associated with a user based on sensor measurements performed by the wearable device. Examples of physiological data may include temperature data, heart rate data, photoplethysmography (PPG) data, blood-oxygen saturation data, and the like. The physiological data collected, monitored, and tracked via the wearable device may be used to gain health insights about the user, such as the user's sleeping patterns, activity patterns, and the like.

Many wearable devices exhibit sensor designs in which the various sensors of the wearable devices are arranged such that multiple measurement paths may exist between one or more sensors of the wearable device. For example, a wearable device designed to be worn on a finger of a user may include a set of sensors (e.g., light-emitting diodes (LEDs) and photodetectors). In this example, the set of sensors may be configured to perform various types of measurements, such as heart rate measurements and blood oxygen saturation measurements. In some cases, the set of sensors may be arranged around the wearable device such that multiple measurement paths, which may be referred to as optical channels or optical paths, may be produced between a pair of sensors to collect physiological data associated with a heart rate of the user and to perform blood oxygen saturation measurements.

However, depending on the arrangement of optical channels (and the positioning of the wearable device relative to the user's skin), some optical channels may be result in high signal quality for some types of measurements (e.g., heart rate detection), but low signal quality for other types of measurements (e.g., blood oxygen saturation measurements). For example, a single optical channel may utilize pulsating blood vessels to perform high-quality heart rate measurements, but such pulsating blood vessels may be perceived as noise that detrimentally affect blood oxygen saturation measurements. As such, different optical channels may be associated with different measurement qualities.

Additionally, or alternatively, optical channels may exhibit varying levels of power consumption. That is, a first optical channel may achieve a certain quality of heart rate measurements using a first power consumption, whereas a second optical channel requires a higher power consumption to achieve the same quality of heart rate measurements. As such, different quantities, combinations, or both, of optical channels may be used to perform heart rate measurements, blood oxygen saturation measurements, or both, to achieve high measurement quality but may also be associated with high power consumption.

In this regard, there is a tension between measurement quality and power consumption caused by different optical channel selections based on the arrangement of the sensors within the wearable device and the physiology of the user's finger. In particular, varying selection of optical channels may result in high measurement quality, but may detrimentally affect power consumption. Conversely, different selection of optical channels may result in optical power consumption, but may detrimentally affect measurement quality.

Accordingly, aspects of the present disclosure support adaptive sensor selection that may result in reduced power consumption and an increase in the accuracy of physiological data collection. In particular, aspects of the present disclosure may support techniques for selecting one or more optical channels of a set of optical channels supported by a wearable device based on respective measurement quality metrics and respective power consumption metrics associated with each optical channel. In other words, techniques described herein may enable a wearable device to test out different optical channels for physiological measurements, and select which optical channel(s) will be used to perform measurements based on measurement quality metrics, power consumption metrics, or both, associated with the respective channels.

For example, a wearable device (e.g., wearable ring device) may support a set of light-emitting components, including a first light-emitting component and a second light-emitting component, located on an inner surface of a wearable device. Additionally, the wearable device may support one or more photodetectors located on the inner surface, including a first photodetector located between the first light-emitting component and the second light-emitting component.

In some implementations, the sensor arrangement of the wearable device described herein may enable different pairs of sensors (e.g., pairs of light-emitting components and photodetectors) to exhibit varying optical channel lengths with different penetration depths. As such, by enabling different optical channel lengths with different penetration depths, the sensor arrangements described herein may use the same set of sensors to perform different types of measurements (e.g., heart rate measurements, blood oxygen measurements) with optical channels of varying lengths and penetration depths, thereby producing varying levels of measurement quality and power consumption.

As such, a controller associated with the first light-emitting component, the second light-emitting component, the first photodetector, or any combination thereof, may selectively activate the first light-emitting component, the second light-emitting component, or both, based on selection of one or more optical channels. That is, the system associated with the wearable device may select one or more optical channels based on respective measurement quality metrics, power consumption metrics, or both, and may activate the first light-emitting component, the second light-emitting component, or both based on the selection.

For example, the wearable device may collect physiological data associated with a blood oxygen saturation of a user associated with the wearable device using a first light-emitting diode on the first light-emitting component and the photodetector (e.g., the first optical channel). However, the system associated with the wearable device may determine a measurement quality of each optical channel supported by the wearable device, such that the system may determine that a second optical channel or a third optical channel may result in a higher measurement quality than a measurement quality of the first optical channel. The second optical channel may be associated with physiological data collection using a second light-emitting diode on the first light-emitting component and the photodetector and the third optical channel may be associated with physiological data collection using a third light-emitting diode on the second light-emitting component and the photodetector.

Additionally, the system may measure a power consumption of each optical channel supported by the wearable device, such that the system may determine that the second optical channel may result in higher power consumption than power consumption associated with the first optical channel and the third optical channel may result in lower power consumption than power consumption associated with the first optical channel. As such, the system may select the third optical channel and the wearable device may collect physiological data associated with the blood oxygen saturation of the user associated with the wearable device using the third light-emitting diode on the second light-emitting component and the photodetector (e.g., the third optical channel), such that the system may achieve a higher measurement quality and a lower power consumption compared to physiological data collection via the first optical channel.

Additionally, or alternatively, the system may measure a power consumption, measurement quality, or both, of each optical channel supported by the wearable device, such that the system may adjust (e.g., reduce) an emission power of one or more light-emitting components (e.g., or light-emitting diode) based on the power consumption, the measurement quality, or both. For example, the wearable device may collect physiological data associated with the blood oxygen saturation of the user associated with the wearable device using the first light-emitting diode on the first light-emitting component and the photodetector (e.g., the first optical channel). Additionally, the system may determine that a measurement quality associated with the first optical channel exceeds a threshold (e.g., minimum measurement quality). In some cases (e.g., to reduce power consumption), the system may adjust (e.g., reduce) an emission power associated with the first light-emitting component (e.g., the first light-emitting diode on the first light-emitting component) such that the system reduces the power consumption associated with the first optical channel (e.g., as compared to a power consumption prior to emission power adjustment) while maintaining a measurement quality that exceeds the threshold.

Additionally, or alternatively, the system may measure a power consumption, measurement quality, or both, of each optical channel supported by the wearable device, such that the system may adjust (e.g., reduce) one or more measurement parameters (e.g., photodetector readout parameters) of one or more photodetectors based on the power consumption, the measurement quality, or both. For example, the wearable device may collect physiological data associated with the blood oxygen saturation of the user associated with the wearable device using the first light-emitting diode on the first light-emitting component and the photodetector (e.g., the first optical channel). Additionally, the system may determine that a power consumption of the first light-emitting component exceeds a first threshold (e.g., a maximum power consumption). In some cases (e.g., to reduce power consumption), the system may adjust one or more measurement parameters (e.g., photodetector readout parameters) of the photodetector such that the system reduces the power consumption associated with the first optical channel (e.g., to below the first threshold) while maintaining a measurement quality that exceeds a second threshold (e.g., a minimum measurement quality). In another example, the system may determine that a measurement quality associated with the first optical channel is below the second threshold and that the power consumption of the first light-emitting component is below the first threshold. In such cases, the system may adjust one or more measurement parameters of the photodetector such that the system increases the measurement quality of the first optical channel while maintaining the power consumption of the first light-emitting component below the first threshold.

Aspects of the disclosure are initially described in the context of systems supporting physiological data collection from users via wearable devices. Aspects of the disclosure are then described in the context of a wearable device. Aspects of the disclosure are further illustrated by and described with reference to apparatus diagrams, system diagrams, and flowcharts that relate to techniques for adaptive sensors of a wearable device.

FIG. 1 illustrates an example of a system 100 that supports techniques for adaptive sensors of a wearable device in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks", 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support adaptive sensor selection of a wearable device in accordance with aspects of the present disclosure. In particular, a ring 104, such as a ring 104-*a*, a ring 104-*b*, or a ring 104-*n*, may support multiple sensors in which one or more sensors, such as a photodetector, may be located at an offset from a radial midpoint of a segment created by a set of sensors, such as a first light-emitting component and a second light-emitting component. In other words, a ring 104 may exhibit an asymmetrical sensor arrangement in which at least one sensor of the ring 104 is positioned asymmetrically relative to a hemisphere of the ring 104, relative to other sensors of the ring 104, or both.

For example, a ring 104-*a* may include a housing configured to contain a photodetector, a first light-emitting component, and a second light-emitting component. The first light-emitting component may be located at a first radial position within an inner circumference of the ring 104-*a* and the second light-emitting component may be located at a second radial position within the inner circumference of the ring 104-*a*, such that the first radial position and the second radial position form a segment of the inner circumference with a radial midpoint. Additionally, the photodetector may be located at a third radial position within the inner circumference of the ring 104-*a* that is offset from the radial midpoint, producing an asymmetric sensor configuration (e.g., the photodetector is arranged asymmetrically with respect to the first and second light-emitting components).

In some cases, locating the photodetector at the third radial position, offset from the radial midpoint, may result in the ring 104-*a* supporting multiple optical channels (e.g., optical channels) of different lengths. That is, a first optical channel between the first light-emitting component and the photodetector may be different in length than a second optical channel between the second light-emitting component and the photodetector. In such cases, the first optical channel may support a first penetration depth into a tissue of the user 102-*a* and the second optical channel may support a second penetration depth into the tissue of the user 102-*a*. The different penetration depths of the different optical channels may enable the different respective channels to perform different types of measurements (e.g., heart rate vs. blood oxygen saturation).

Additionally, or alternatively, a third optical channel between the first light-emitting component and the photodetector may be different in length than a fourth optical channel between the first light-emitting component and the photodetector based on the third optical channel being associated with a first light-emitting chip at the first light-emitting component and the fourth optical channel being associated with a second light-emitting chip at the first light-emitting component. That is, the first light-emitting chip may emit light within a first wavelength range and the second light-emitting chip may emit light within a second wavelength range, such that the third optical channel may support a third penetration depth into a tissue of the user 102-*a* and the fourth optical channel may support a fourth penetration depth into the tissue of the user 102-*a* based on the respective wavelengths.

Thus, a controller associated with the ring 104-*a* may select one or more optical channels based on a power consumption, a measurement quality, physiological data (e.g., temperature data, accelerometer data, contact pressure data, or any combination thereof), or any combination thereof. That is, the controller may activate the first light-emitting component, the second light-emitting component, or both, based on a desired optical channel.

Though described in the context of an asymmetrical sensor layout (e.g., design) it is understood that the techniques described herein may support any sensor layout of a wearable device, including a symmetrical sensor layout, producing multiple optical channels.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
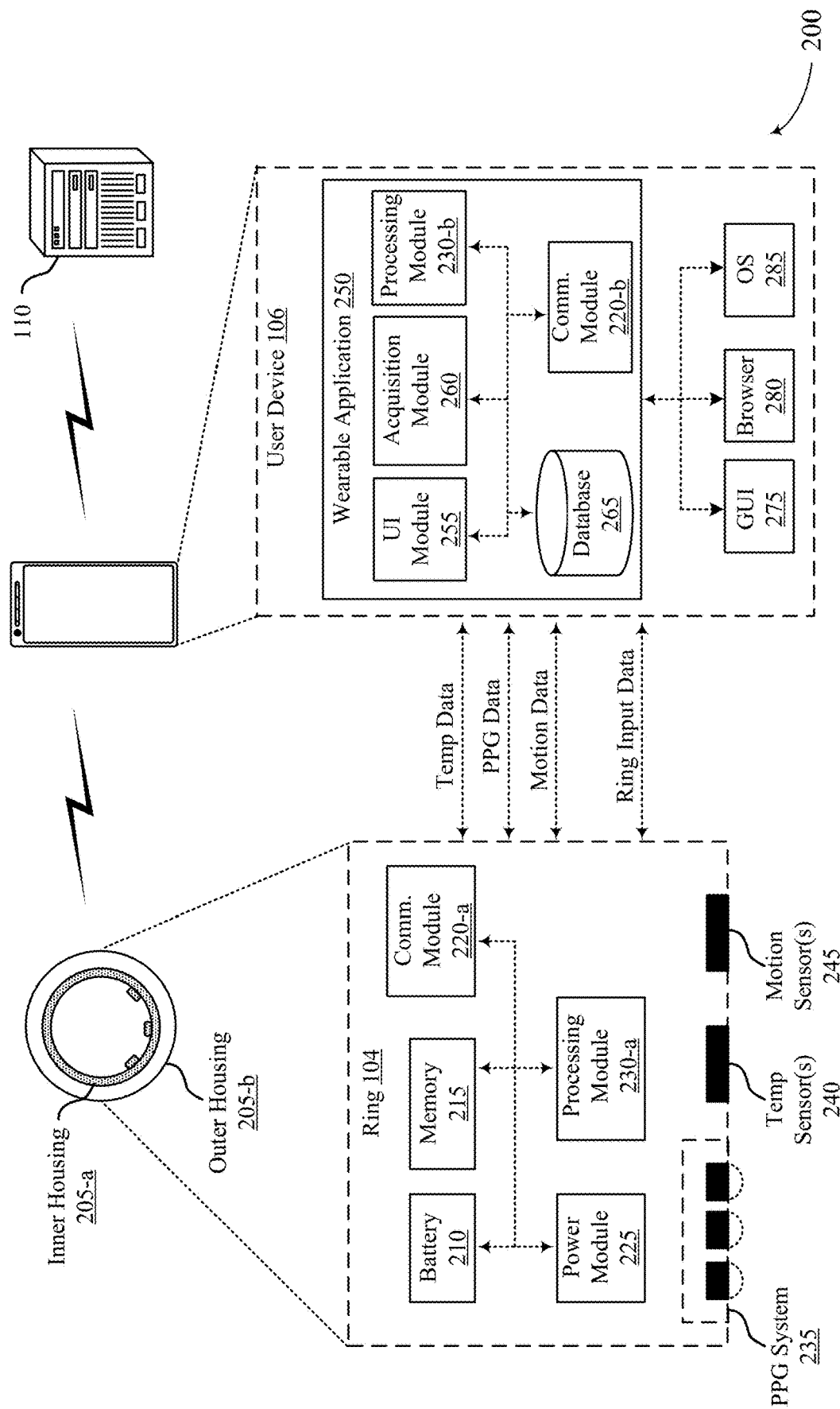
FIG. 2 illustrates an example of a system that supports techniques for adaptive sensors of a wearable device in accordance with aspects of the present disclosure.

FIG. 2 illustrates an example of a system 200 that supports techniques for adaptive sensors of a wearable device in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels, and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-*a* and an outer housing 205-*b*. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-*a*, a memory 215, a communication module 220-*a*, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using a clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-a. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-*a* (e.g., an integrated Bluetooth Low Energy transceiver) and/or additional onboard memory 215.

The communication module 220-*a* may include circuits that provide wireless and/or wired communication with the user device 106 (e.g., communication module 220-*b* of the user device 106). In some implementations, the communication modules 220-*a*, 220-*b* may include wireless communication circuits, such as Bluetooth circuits and/or Wi-Fi circuits. In some implementations, the communication modules 220-*a*, 220-*b* can include wired communication circuits, such as Universal Serial Bus (USB) communication circuits. Using the communication module 220-*a*, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during 104 charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during 104 charging, and under voltage during 104 discharge. The power module 225 may also include electro-static discharge (ESD) protection.

The one or more temperature sensors 240 may be electrically coupled to the processing module 230-*a*. The temperature sensor 240 may be configured to generate a temperature signal (e.g., temperature data) that indicates a temperature read or sensed by the temperature sensor 240. The processing module 230-*a* may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-*a*) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-*a* may use to determine the temperature. As another example, in cases where the temperature sensor 240 includes a passive sensor, the processing module 230-*a* (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during 104 exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-a near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-a may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-a may sample the sensors at different rates and average/store different values for the different sensors. In some implementations, the processing module 230-a may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-a may sample the PPG signal and determine a user's pulse waveform based on the PPG signal. The processing module 230-a may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-a may control one or both of the optical transmitters to transmit light while sampling the PPG signal generated by the optical receiver. In some implementations, the processing module 230-a may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-a may store the pulse waveform in memory 215 in some implementations. The processing module 230-a may process the pulse waveform as it is generated and/or from memory 215 to determine user physiological parameters described herein.

The processing module 230-a may determine the user's heart rate based on the pulse waveform. For example, the processing module 230-a may determine heart rate (e.g., in beats per minute) based on the time between peaks in the pulse waveform. The time between peaks may be referred to as an interbeat interval (IBI). The processing module 230-a may store the determined heart rate values and IBI values in memory 215.

The processing module 230-a may determine HRV over time. For example, the processing module 230-a may determine HRV based on the variation in the IBIs. The processing module 230-a may store the HRV values over time in the memory 215. Moreover, the processing module 230-a may determine the user's respiratory rate over time. For example, the processing module 230-a may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-a may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BM1160 inertial micro electro-mechanical system (MEMS) sensor that may measure angular rates and accelerations in three perpendicular axes.

The processing module 230-a may sample the motion signals at a sampling rate (e.g., 50 Hz) and determine the motion of the ring 104 based on the sampled motion signals. For example, the processing module 230-a may sample acceleration signals to determine acceleration of the ring 104. As another example, the processing module 230-a may sample a gyro signal to determine angular motion. In some implementations, the processing module 230-a may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-a may compress the data stored in memory 215. For example, the processing module 230-a may delete sampled data after making calculations based on the sampled data. As another example, the processing module 230-a may average data over longer periods of time in order to reduce the number of stored values. In a specific example, if average temperatures for a user over one minute are stored in memory 215, the processing module 230-a may calculate average temperatures over a five minute time period for storage, and then subsequently erase the one minute average temperature data. The processing module 230-a may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during 104 portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS) (e.g., OS 285), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-b, a communication module 220-b, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support adaptive sensor selection of a wearable device in accordance with aspects of the present disclosure. In particular, a ring 104 may support multiple sensors including pressure sensors, a PPG system 235, temp sensors 245, and motion sensors 245. Further, the PPG system 235 may include one or more photodetectors, including a first photodetector and a second photodetector, and one or more light-emitting components, such as a first light-emitting component and a second light-emitting component. For example, as shown in FIG. 2, a ring 104 may include an inner housing 205-a configured to contain the first photodetector, the first light-emitting component, and the second light-emitting component.

In some cases, the first light-emitting component may be located at a first radial position within the inner housing 205-a and the second light-emitting component may be located at a second radial position within the inner housing 205-a, such that the first radial position and the second radial position form a segment of the inner circumference with a radial midpoint. Additionally, the first photodetector may be located at a third radial position within the inner housing 205-a that is offset from the radial midpoint, producing an asymmetric sensor configuration. In this regard, the photodetector may be positioned within the inner housing 205-a in an asymmetrical arrangement with respect to the first and second light-emitting components.

In some cases, locating the first photodetector at the third radial position, offset from the radial midpoint, may result in the ring 104 supporting multiple optical channels of different lengths and penetration depths. In other words, the asymmetrical arrangement of the photodetector may enable multiple optical channels with varying optical lengths and penetration depths. That is, a first optical channel between the first light-emitting component and the first photodetector may be different in length than a second optical channel between the second light-emitting component and the first photodetector. In such cases, the first optical channel may support a first penetration depth into a tissue of a user 102 and the second optical channel may support a second penetration depth into the tissue of the user 102.

Additionally, or alternatively, a third optical channel between the first light-emitting component and the photodetector may be different in length than a fourth optical channel between the first light-emitting component and the photodetector based on the third optical channel being associated with a first light-emitting chip at the first light-emitting component and the fourth optical channel being associated with a second light-emitting chip at the first light-emitting component. That is, the first light-emitting chip may emit light within a first wavelength range and the second light-emitting chip may emit light within a second wavelength range, such that the third optical channel may support a third penetration depth into a tissue of the user 102 and the fourth optical channel may support a fourth penetration depth into the tissue of the user 102 based on the respective wavelengths.

Thus, a controller associated with the ring 104, such as a server 110, a processing module 230, an acquisition module 260, or a communication module 220, among other examples, may select one or more optical channels based on a measurement (e.g., signal) quality metric (e.g., perfusion index or signal amplitude) associated with each optical channel, a power consumption associated with each light-emitting component, a power consumption associated with each photodetector, physiological data (e.g., temperature data, accelerometer data, contact pressure data, or any combination thereof), or any combination thereof. That is, one or more components of the system 200 may measure a measurement quality metric associated with each optical channel, a power consumption associated with each light-emitting component, a power consumption associated with each photodetector, or any combination thereof. Subsequently, the wearable device 104 may select which optical channel will be used to perform physiological data measurements based on the measurement quality metrics, the power consumption metrics, or both, associated with the respective optical channels.

For example, the ring 104 may collect physiological data associated with a blood oxygen saturation of the user 102 via the first optical channel between the first light-emitting component and the first photodetector. In some cases, a controller, such as the processing module 230-a, may determine, via the battery module 225, that the ring 104 is low on power. In such cases, the processing module 230-a may configure the ring 104 to collect the physiological data associated with the blood oxygen saturation of the user 102 via the second optical channel between the second light-emitting component and the first photodetector (e.g., switch optical channels) based on a lower power consumption associated with the second optical channel compared to the first optical channel.

Additionally, or alternatively, the processing modules 230-a may configure the ring 104 to collect the physiological data associated with the blood oxygen saturation of the user 102 via first optical channel between the first light-emitting component and the first photodetector based on configuring the first light-emitting component to operate at a reduced power (e.g., operate in a power saving mode). That is, the processing modules 230-a may configure the ring 104 to transmit light via the first light-emitting component at a reduced (e.g., lower) transmit power, which may also be referred to as a transmission power, emission power, or the like thereof (e.g., as compared to a maximum transmit power of the first light-emitting component), such that the first light-emitting component be associated with reduced power consumption (e.g., as compared to power consumption associated with the first light-emitting component transmitting light at the maximum transmit power).

In another example, the ring 104 may collect physiological data associated with a blood oxygen saturation of the user 102 via the first optical channel between the first light-emitting component and the first photodetector. In some cases, the processing module 230-a, may determine that a measurement quality (e.g., signal quality) associated with light received by the first photodetector via the first optical channel is below a threshold measurement quality. In some examples, the processing module 230-a may configure the ring 104 to collect the physiological data associated with the blood oxygen saturation of the user 102 via the second optical channel between the second light-emitting component and the first photodetector (e.g., switch optical channels) based on a higher measurement quality associated with light received by the first photodetector via the second optical channel (e.g., a measurement quality above the threshold).

FIG. 3 illustrates an example of a wearable device 300 that supports techniques for adaptive sensors of a wearable device in accordance with aspects of the present disclosure. The wearable device 300 may implement, or be implemented by, aspects of the system 100, the system 200, or both.

The wearable device 300 shown in FIG. 3 illustrates an example of a wearable device 104. The wearable device 104 may include one or more photodetectors 310, such as a photodetector 310-a (e.g., PD1), a photodetector 310-b (e.g., PD2), and a photodetector 310-c (e.g., PD3), and one or more light-emitting components (e.g., LEDs 315), such as an LED 315-a (e.g., LED1) and an LED 315-b (e.g., LED2), among other electronic components. In some implementations, one or more photodetectors 310, one or more LEDs 315, or both, may be combined as a single component or may be separate components. In some cases, as depicted in cross sectional view 305-a and cross sectional view 305-b, a set of photodetectors 310, a set of LEDs 315, or both, may be located at radial positions within an inner circumference of the ring 104.

In some implementations, some of the sensors (e.g., photodetectors 310, LEDs 315) of the ring may be positioned on/within the ring 104 symmetrically with respect to an axis of the ring 104, where one or more sensors (e.g., photodetector 310-b) are positioned asymmetrically with respect to the axis and/or the other sensors.

For example, the first LED 315-a and the second LED 315-b may be located at radial positions within the inner circumferential surface of the ring 104, where the radial positions of the LEDs 315-a, 315-b are symmetrical (e.g., mirrored) with respect to an axis of the ring 104. For example, the axis may intersect a radial midpoint of a first segment between the LEDs 315, such that the LED 315-a and the LED 315-b may be equidistant from each point on the axis (e.g., linearly and angularly). In some cases, the first segment of the inner circumferential surface between the first LED 315-a and the second LED 315-b may be less than 180 degrees.

In another example, the photodetector 310-a and the photodetector 310-c may form a second segment of the inner circumferential surface of the ring 104, where the axis may intersect a radial midpoint of the second segment. In this regard, the photodetectors 310-a, 310-c may be equidistant from each point on the axis (e.g., linearly and angularly). In some cases, as depicted in the cross sectional view 305-a, the midpoint of the first segment associated with the set of LEDs 315-a, 315-b may be the same as the midpoint of the second segment associated with the set of photodetectors 310-a, 310-c.

Comparatively, in some cases, one or more sensors, such as a photodetector 310, may be located asymmetrically within an inner circumference of the ring 104. That is, a photodetector 310, such as the photodetector 310-b, may be located at a radial position that is offset from the axis (e.g., the photodetector 310-b may not intersect the midpoint of the first section, the second section, or both). For example, the photodetector 310-b may be located at a radial offset from the axis by an angle. In this regard, the photodetector 310-b may be positioned within the ring 104 asymmetrically with respect to the axis, the other sensors, or both. Though described in the context of an asymmetrical sensor layout, it is understood that the techniques described herein may be supported by any sensor layout.

Additionally, each LED 315 may include one or more light-emitting chips or components, such as a red diode (e.g., LED) 325, an IR diode 330, and a green diode 335. Additionally, each diode may be configured to (e.g., be capable of) emitting light within a respective wavelength range. For example, a red diode 325 may emit light within a first wavelength range (e.g., red light), an IR diode 330 may emit light within a second wavelength range (e.g., IR light), and a green diode 335 may emit light within a third wavelength range (e.g., green light). In some cases, the first wavelength range, the second wavelength range, and the third wavelength range may be unique (e.g., different). In this regard, the LEDs 315-a, 315-b may be referred to as "triple-LEDs" that are each configured to emit light in three separate wavelength ranges.

Though described in the context of red diodes 325, IR diodes 330, and green diodes 335, it is understood that diodes on an LED 315 may be associated with any color of light within a spectrum. That is, a diode may be configured to emit light within a wavelength range not limited to the first wavelength range, the second wavelength range, or the third wavelength range. For example, as described previously herein, light-emitting components of the present disclosure (e.g., LEDs 315) may include additional diodes configured to emit light in any wavelength range of color, such as yellow light, blue light, etc.

The ring 104 may support multiple optical channels 320, which may also be referred to as optical channels, of different lengths. That is, an optical channel 320 may be an optical channel between a photodetector 310 and an LED 315 over which light may be transmitted. For example, the photodetector 310-a may receive light from the LED 315-a along the optical channel 320-a, the photodetector 310-b may receive light from the LED 315-a along the optical channel 320-g, and the photodetector 310-c may receive light from the LED 315-a along the optical channel 320-d.

In some cases, the length of an optical channel 320 may be based on a photodetector 310 and an LED 315 associated with the optical channel 320, such that two or more of the optical channels 320 may be different in length. That is, the length of an optical channel 320 may be based on a location (e.g., radial distances or offsets) of a photodetector 310 relative to an LED 315. For example, a length of the optical channel 320-a between the LED 315-a and the photodetector 310-a, a length of the optical channel 320-g between the LED 315-a and the photodetector 310-b, and a length of the optical channel 320-d between the LED 315-a and the photodetector 310-c may be different based on respective radial positions of the photodetectors 310 relative to the LED 315-a. Similarly, a length of an optical channel 320-j between the LED 315-b and the photodetector 310-c, a length of an optical channel 320-m between the LED 315-b and the photodetector 310-a, and a length of an optical channel 320-q between the LED 315-b and the photodetector 310-b may be different based on respective radial positions of the photodetectors 310 relative to the LED 315-b.

Additionally, or alternatively, the length of an optical channel 320 may be based on a diode (e.g., a red diode 325, an IR diode 330, or a green diode 335) associated with the optical channel 320. That is, each optical channel 320 may be associated with a penetration depth into a tissue of the user 102 based on a respective wavelength range associated with light emitted by a diode. For example, a first penetration depth may be associated with light emitted via a green diode 335, a second penetration depth may be associated with light emitted via a red diode 325, and a third penetration depth may be associated with light emitted via an IR diode 330 (e.g., for the same path). In some cases, the first penetration depth may be less than (e.g., shallower, less deep than) the second penetration depth, which may be less than the third penetration depth.

As such, multiple optical channels 320 of different length may exist between an LED 315 and a photodetector 310 based on a diode used to emit light from the LED 315 to the photodetector 310 (e.g., based on different penetration depths). For example, the optical channel 320-a, an optical channel 320-b, and an optical channel 320-c may exist between the LED 315-a and the 310-a. That is, the optical channel 320-a may be associated with emission of light from a green diode 335 on the LED 315-a, the optical channel 320-b may be associated with emission of light from a red diode 325 on the LED 315-a, and the optical channel 320-c may be associated with emission of light from an IR diode 330 on the LED 315-a. The optical channel 320-a may be shorter than the optical channel 320-b which may be shorter than the optical channel 320-c based on the first penetration depth associated with the green diode 335 being less than the second penetration depth associated with the red diode 325, which is less than the third penetration depth associated with the IR diode 330.

Similarly, the optical channel 320-d, an optical channel 320-e, and an optical channel 320-f may exist between the LED 315-a and the 310-c, where the optical channel 320-d is associated with the green diode 335 on the LED 315-a, the optical channel 320-e is associated with the red diode 325 on the LED 315-a, and the optical channel 320-f is associated with the IR diode 330 on the LED 315-a. Additionally, the optical channel 320-g, an optical channel 320-h, and an optical channel 320-i may exist between the LED 315-a and the 310-b, where the optical channel 320-g is associated with the green diode 335 on the LED 315-a, the optical channel 320-h is associated with the red diode 325 on the LED 315-a, and the optical channel 320-i is associated with the IR diode 330 on the LED 315-a.

Similarly, the optical channel 320-j, an optical channel 320-k, and an optical channel 320-l may exist between the LED 315-b and the 310-c, where the optical channel 320-j is associated with a green diode 335 on the LED 315-b, the optical channel 320-k is associated with a red diode 325 on the LED 315-b, and the optical channel 320-l is associated with an IR diode 330 on the LED 315-b. Additionally, the optical channel 320-m, an optical channel 320-n, and an optical channel 320-p may exist between the LED 315-b and the 310-a, where the optical channel 320-m is associated with the green diode 335 on the LED 315-b, the optical channel 320-n is associated with the red diode 325 on the LED 315-b, and the optical channel 320-p is associated with the IR diode 330 on the LED 315-b. Additionally, the optical channel 320-q, an optical channel 320-r, and an optical channel 320-s may exist between the LED 315-b and the 310-b, where the optical channel 320-q is associated with the green diode 335 on the LED 315-b, the optical channel 320-r is associated with the red diode 325 on the LED 315-b, and the optical channel 320-s is associated with the IR diode 330 on the LED 315-b.

In this regard, the ring 104 depicted in FIG. 3, may support eighteen optical channels 320, or measurement (e.g., signal) paths (e.g., channels), for collecting physiological data (e.g., 2 LEDs 315×3light emitting diodes/LED 315× 3optical channels 320/LED 315). For example, the system 200 may collect first physiological data associated with light emitted from the LED 315-a to the photodetector 310-a via the optical channel 320-a using the green diode 335 on the LED 315-a, second physiological data associated with light emitted from the LED 315-a to the photodetector 310-a via the optical channel 320-b using the red diode 325 on the LED 315-a, and third physiological data associated with light emitted from the LED 315-a to the photodetector 310-a via the optical channel 320-c using the IR diode 330 on the LED 315-a. Similarly, the system 200 may collect the first physiological data associated with light emitted from the LED 315-a to the photodetector 310-a via the optical channel 320-a using the green diode 335 on the LED 315-a, fourth physiological data associated with light emitted from the LED 315-a to the photodetector 310-b via the optical channel 320-g using the green diode 335 on the LED 315-a, and fifth physiological data associated with light emitted from the LED 315-a to the photodetector 310-c via the optical channel 320-d using the green diode 335 on the LED 315-a.

The system 200 may collect additional physiological data using each diode (e.g., light-emitting chip) on the LED 315-a along each additional optical channel 320 from the LED 315-a (e.g., the optical channel 320-e, the optical channel 3204, the optical channel 320-h, and the optical channel 320-i). Additionally, or alternatively, the system 200 may collect additional physiological data using each diode on the LED 315-b along each optical channel 320 (e.g., the optical channel 320-j, the optical channel 320-k, the optical channel 320-l, the optical channel 320-m, the optical channel 320-n, the optical channel 320-p, the optical channel 320-q, the optical channel 320-r, and the optical channel 320-s). Though described in the context of physiological data collection associated with eighteen measurement paths, it is understood that the system 200 may collect physiological data using any quantity or combination of the eighteen measurement/optical paths.

In some cases, a system 200 associated with the ring 104 may collect physiological data associated with the user 102 based on light received by the photodetectors 310 from the LEDs 315 along the optical channels 320. For example, a controller communicatively coupled to one or more of the LEDs 315, one or more of the photodetectors 310, or any combination thereof, may collect physiological data associated with the user 102 based on light received by a photodetector 310 and light emitted from one or more LEDs 315 (e.g., along one or more optical channels 320).

In some cases, the controller may selectively activate one or more of the LEDs 315 (e.g., diodes, such as a red diode 325, an IR diode 330, or a green diode 335, within the LEDs 315) or photodetectors 310 based on a respective metrics associated with each optical channel 320 (e.g., associated with light received by one or more of the photodetectors 310). That is, the system 200 may determine respective measurement quality metrics and respective power consumptions metrics associated with each optical channel 320 used to collect physiological data from the user 102 (e.g., from the 18 optical channels supported by the ring 104) and may select one or more optical channels 320 from the set of optical channels 320 to use to collect additional physiological data based on a comparison of the respective measurement quality metrics and respective power consumption metrics associated with each optical channel 320.

For example, a first measurement quality metric may be associated with light received by the photodetector 310-a from the LED 315-a (e.g., the green diode 335 at the LED 315-a) via the optical channel 320-a, a second measurement quality metric may be associated with light received by the photodetector 310-*a* from the LED 315-*a* (e.g., the red diode 325 at the LED 315-*a*) via the optical channel 320-*b*, and a third measurement quality metric may be associated with light received by the photodetector 310-*a* from the LED 315-*a* (e.g., the IR diode 330 at the LED 315-*a*) via the optical channel 320-*c*. Additionally, the first measurement quality metric may be greater than the second measurement quality metric which may further be greater than the third quality metric. In some examples, the system 200 may select the optical channel 320-*a* based on the first measurement quality metric being greater than the second measurement quality metric and the third measurement quality metric.

Additionally, the system 200 may generate a signal based on light transmitted via (e.g., along) the optical channel 320-*a* and may acquire physiological data based on the signal. In some other examples, the system 200 may select the optical channel 320-*a* and the optical channel 320-*b* based on the first measurement quality metric and the second measurement quality metric being greater than the third measurement quality metric. Additionally, the system 200 may generate a first signal based on first light transmitted via the optical channel 320-*a* and a second signal based on second light transmitted via the optical channel 320-*b*, such that the system 200 may acquire physiological data based on the first signal and the second signal.

Additionally, or alternatively, the controller may selectively activate one or more of the LEDs 315 (e.g., diodes, such as a red diode 325, an IR diode 330, or a green diode 335, within the LEDs 315) or photodetectors 310 based on a respective power consumption metrics associated with each optical channel 320 (e.g., associated with light received by one or more of the photodetectors 310). For example, a first power consumption metric may be associated with the LED 315-*a* and a second power consumption may be associated with the LED 315-*b*. In some cases, the first power consumption may be less than the second power consumption, such that the controller may use (e.g., activate) one or more optical channels 320 associated with the LED 315-*a* for collection of physiological data based on the wearable device 104 operating in a low power mode. In some other cases, the controller may use one or more optical channels 320 associated with the LED 315-*b* or both LEDs 315 for collection of physiological data based on the ring 104 operating in a high power mode. Similarly, a third power consumption may be associated with the photodetector 310-*a*, a fourth power consumption may be associated with the photodetector 310-*b*, and a fifth power consumption may be associated with the photodetector 310-*c*, such that the controller may selectively use one or more optical channels 320 associated with one or more of the photodetectors 310 based on a power mode associated with the ring 104.

In some examples, the system 200 may collect temperature data using one or more temperature sensors of the ring 104 and may select one or more optical channels based on the temperature data. In particular, it has been found that different wavelengths of light penetrate the user's skin with varying efficiencies depending on the skin temperature. For example, green light may exhibit a first penetration depth when the user's skin temperature is high, and may exhibit a second penetration depth when the user's skin temperature is low. As such, varying skin temperature may affect both the measurement quality and power consumption associated with collecting physiological data along a given optical channel. Accordingly, in some implementations, the wearable device 104 may leverage temperature data collected via one or more temperature sensors of the wearable device to help guide optical channel selection.

For example, a first range of temperature values may be associated with the first penetration depth further associated with light emitted via a green diode 335, a second range of temperature values may be associated with the second penetration depth further associated with light emitted via a red diode 325, and a third range of temperature values may be associated with the third penetration depth further associated with light emitted via an IR diode 330. In some examples, the first range of temperature values may be greater (e.g., warmer) than the second range of temperature values, which may further be greater than the third range of temperature values. That is, at lower temperature values (e.g., the third range of temperature values), optical channels 320 associated with deeper penetration depths (e.g., such as those associated with emission of light via the IR diode 330) may be associated with higher measurement quality metrics as compared to less deep penetration depths (e.g., such as those associated with emission of light via the green diode 335).

For instance, the system 200 may collect first temperature data via a first temperature sensor, where the first temperature data includes a first temperature value within the third range of temperature values. As such, the system 200 may select one or more optical channels 320 associated with light emitted via an IR diode 330, such as the optical channel 320-*c*, the optical channel 3204, the optical channel 320-*i*, the optical channel 320-1, the optical channel 320-*p*, and the optical channel 320-*s*. Additionally, or alternatively, the system 200 may collect second temperature data via a second temperature sensor and may identify a subset of optical channels 320, select one or more optical channels 320, or both, based on a comparison of the first temperature data and the second temperature data.

In this regard, the wearable device 104 may leverage temperature data collected at different portions/regions of the wearable device 104 to perform optical channel selection. For example, the wearable device 104 may determine that temperature sensors proximate to the first LED 315-*a* exhibit higher temperature measurements as compared to temperature measurements proximate to the second LED 315-*b*. In this example, the wearable device 104 may determine that optical channels associated with the first LED 315-*a* are likely to exhibit higher signal quality metrics and/or lower power consumption metrics as compared to the second LED 315-*b* (or vice versa). As such, the wearable device 104 may be able to "narrow down" the list of candidate optical channels for testing, such as by testing only those optical channels which are likely to exhibit better signal quality metrics and/or better power consumption metrics.

In some examples, the system 200 may acquire physiological data using one or more accelerometers on the ring 104. In such cases, the system 200 may select at least one accelerometer of the one or more accelerometers on the ring 104 based on a measurement quality metric, a power consumption metric, or both, associated with the at least one accelerometer. As such, the system 200 may determine a heart rate measurement associated with the user 102 based on the physiological data acquired using one or more optical channels 320 and acceleration data acquired using the at least one accelerometer. The acceleration data may include an indication of contact (e.g., skin contact, contact pressure) between the wearable device 104 and the finger of the user 102.

For example, the wearable device 104 may collect PPG-based physiological data using one or more first optical channels 320, and may collect acceleration data using one or more accelerometers. In this example, the wearable device 104 may determine an acceleration of the wearable device 104 in relation to one or more sensors associated with the one or more optical channels 320 (e.g., one or more LEDs 315, one or more photodetectors 310, or both) using the acceleration data collected via the one or more accelerometers. For instance, the wearable device 104 may determine the wearable device 104 has accelerated in a direction opposite the one or more sensors associated with the one or more optical channels 320, which may indicate a loss of contact (e.g., skin contact below a threshold level) between the one or more sensors on the wearable device 104 and the finger of the user 102. In such cases, the wearable device 104 may select one or more second optical channel(s) 320 to collect PPG-based physiological data based on the loss of contact associated with the one or more first optical channel(s) 320 (e.g., based on increased power consumption, reduce signal quality, or both, associated with a loss of skin contact).

In some examples, the system 200 may acquire physiological data using one or more pressure sensors (e.g., piezoelectric sensors) on the ring 104. In such cases, the system 200 may select at least one pressure sensor of the one or more pressure sensors on the ring 104 based on a measurement quality metric, a power consumption metric, or both, associated with the at least one pressure sensor. As such, the system 200 may determine a heart rate measurement associated with the user 102 based on the physiological data acquired using one or more optical channels 320 and pressure data (e.g., contact pressure data) acquired using the at least one pressure sensors. In some aspects, the pressure sensors may be used to monitor skin contact pressure between the wearable device 104 and the user's skin, which may indicate how blood vessels are constricted by external pressure on the wearable device 104 and/or by dilated vessels causing increased pressure to the inner surface of the wearable device 104. As such, the pressure data may be used to measure a constriction, a dilation, or both, of one or more blood vessels of the user 102, which may further be used to perform channel selection (e.g., by selecting optical channels which exhibit sufficient skin pressure).

In other words, in some cases, the wearable device 104 may utilize pressure measurements caused by a constriction/dilation of blood vessels to perform heart rate measurements. In some cases, pressure sensors may be able to determine heart rate measurements using lower power consumption as compared to PPG-based sensors (e.g., LEDs 315, photodetectors 310). Such acceleration data may be used in addition to, or in the alternate to, PPG-based heart rate measurements.

For example, the wearable device 104 may collect PPG-based physiological data using one or more optical channels 320, and may collect pressure data using one or more pressure sensors. In this example, the wearable device 104 may determine a heart rate measurement using the physiological data collected via the optical channels 320, using the pressure data, or both. For instance, the wearable device 104 may combine the physiological and pressure data (e.g., weighted combining, averaging, etc.) to determine the heart rate measurements. In such cases, the wearable device 104 may select to perform heart rate measurements using the optical channel(s) 320, the pressure sensors, or both, based on measurement quality metrics and/or power consumption metrics associated with the optical channels 320 and the pressure sensors.

In some examples, the system 200 may determine respective measurement quality metrics, respective power consumption metrics, or both, associated with one or more optical channels 320 during one or more measurement occasions based on a measurement configuration. That is, the system 200 may identify a measurement configuration including multiple measurement occasions for testing a set of optical channels 320 (e.g., determining measurement quality metrics, power consumption metrics, or both) and multiple data collection intervals for collecting physiological data using one or more optical channels 320 the set of optical channels 320. In other words, a measurement configuration may include measurement/testing occasions in which optical channels 320/sensors are tested and compared, and subsequent data collection intervals during which selected optical channels 320/sensors are used to collect physiological data.

For example, the system 200 may acquire physiological data using multiple optical channels 320 during a first measurement occasion. Additionally, the system 200 may determine respective measurement quality metrics and respective power consumption metrics associated with the multiple optical channels 320 based on the physiological data collected during the first measurement occasion. The system 200 may select one or more optical channels 320 from the multiple optical channels 320 based on respective measurement quality metrics and respective power consumption metrics associated with the one or more optical channels 320 and may collect additional physiological data using the one or more optical channels 320 during a first data collection interval.

In some examples, the measurement occasions may be associated with a periodicity such that the system 200 may update respective measurement quality metrics, respective power consumption metrics, or both, associated with one or more optical channels 320 periodically (e.g., during periodic measurement occasions). In other words, the wearable device 104 may periodically test different optical channels 320 for measurement quality/power consumption according to a measurement configuration, and may select one or more of the optical channels 320 which will be used for some time duration (e.g., until the channels are to be tested/compared again).

Continuing with the previous example, the system 200 may acquire second physiological data using the multiple optical channels 320 during a second measurement occasion (e.g., next testing/comparison occasion) based on the periodicity. Additionally, the system 200 may determine respective additional measurement quality metrics and respective additional power consumption metrics associated with the multiple optical channels 320 based on the second physiological data collected during the first measurement occasion. The system 200 may select one or more additional optical channels 320 from the multiple optical channels 320 based on a comparison of the respective additional measurement quality metrics and the respective additional power consumption metrics associated with the one or more optical channels 320 and may collect third physiological data using the one or more additional optical channels 320 during a second data collection interval.

Additionally, or alternatively, the system 200 may determine respective measurement quality metrics, respective power consumption metrics, or both, associated with one or more optical channels 320 during one or more measurement occasions based on one or more thresholds. For example, the system 200 may acquire physiological data via one or more optical channels 320 and may detect when one or more respective measurement quality metrics associated with the one or more optical channels 320 fails to exceed a first threshold (e.g., drops below a threshold). In other words, optical channel reselection may be triggered based on a decrease in measurement quality (e.g., the one or more respective measurement quality metrics dropping below the first threshold). Additionally, or alternatively, the system 200 may detect when one or more respective power consumption metrics associated with the one or more optical channels 320 exceed a second threshold. In other words, optical channel reselection may be triggered based on an increase in power consumption (e.g., the one or more respective power consumption metrics exceed the second threshold).

Stated differently, the wearable device 104 may select one or more optical channels 320 (and/or other sensors such as accelerometers) based on measurement quality metrics and/or power consumption metrics, and may use the selected optical channels 320 (and/or other sensors) to collect physiological data until the selected optical channels 320/sensors are found to collect low-quality data (e.g., data below a threshold quality) and/or result in high power consumption (e.g., power consumption above a power consumption threshold).

While FIG. 3 is shown and described as a ring 104 with photodetectors 310 and LEDs 315, this is not to be regarded as a limitation of the present disclosure, unless noted otherwise herein. In this regard, aspects of the present disclosure may be implemented in the context of any quantity or type of sensors (e.g., electrical components, including but not limited to LEDs 315 and photodetectors 310).

In some implementations, the asymmetrical sensor configuration of the wearable device 104 (e.g., wearable ring device 104) illustrated in FIG. 3 may provide improved robustness against rotation of the wearable device 104 when being worn by the user. That is, as compared to wearable devices 104 with symmetrical sensor configurations, the asymmetrical sensor configuration may enable improved physiological data measurement in cases where the wearable device 104 is inadvertently rotated while being worn by the user. The improved robustness against device rotation may result from the combination of multiple alternative optical channels 320, and adaptive selection of the optical channels 320 that exhibits the highest measurement quality metrics and/or lowest power consumption metrics. As such, the hardware configuration that enables multiple candidate optical channels 320 around the circumference of the wearable device 104, may result in improved robustness to device rotation. For example, in the context of SpO2 measurement with a wearable ring device 104, the wearable ring device 104 may include four separate optical channels 320 (e.g., optical channel 320-*a*, 320-*g*, 320-*j*, 320-*q*) that exhibit optimal distances between the respective photodetectors 310 and LEDs 315 resulting in penetration depths that enable high quality SpO2 measurements. As such, multiple optical channels 320 may be used to perform SpO2 measurements, thereby increasing the likelihood that at least one of the optical channels 320 may be used for SpO2 measurements, regardless as to how the wearable ring device 104 is rotated on the user's finger.

Figure 4:
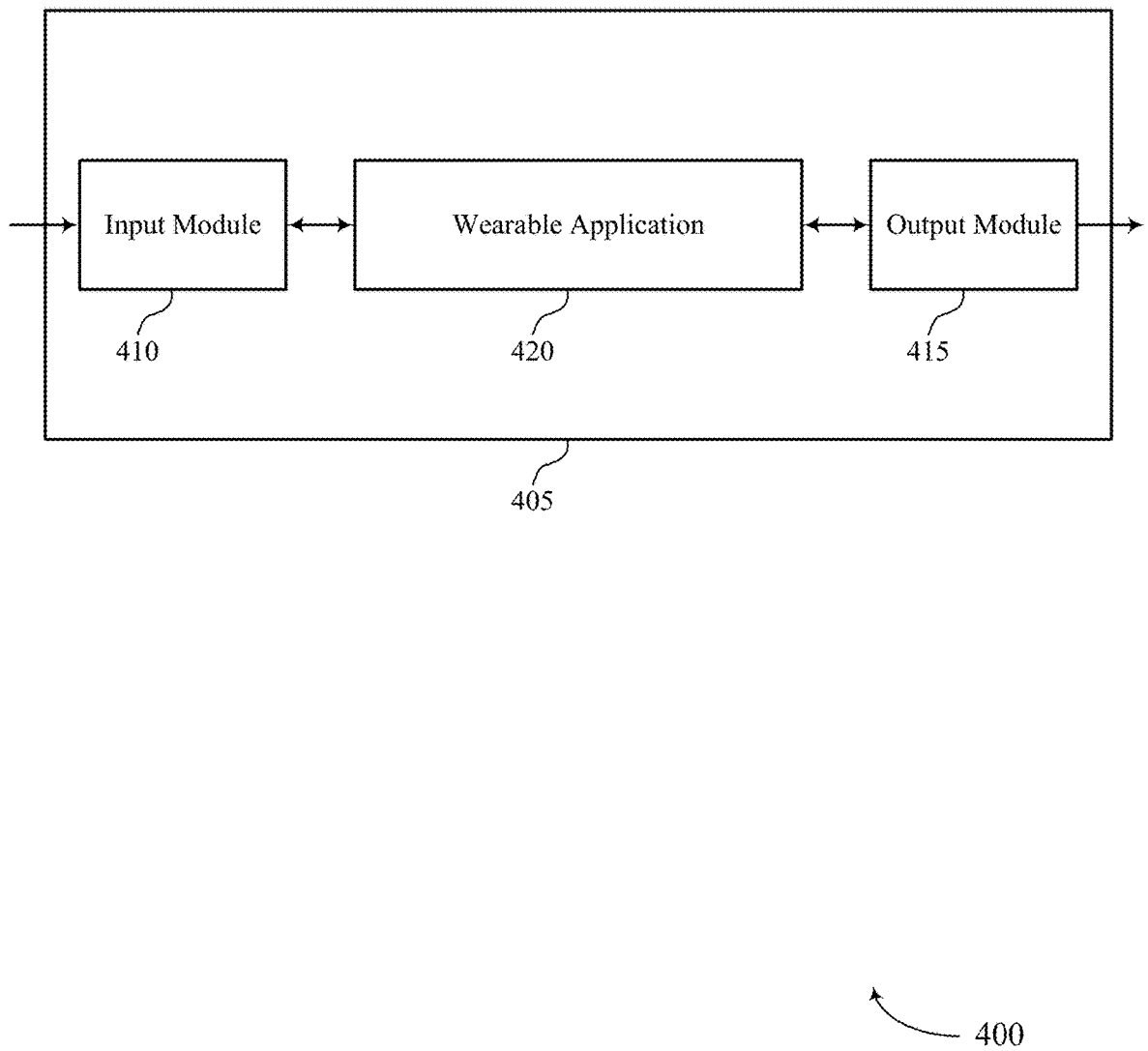
FIGS. 4 and 5 show block diagrams of devices that support techniques for adaptive sensors of a wearable device in accordance with aspects of the present disclosure.

FIG. 4 shows a block diagram 400 of a device 405 that supports techniques for adaptive sensors of a wearable device in accordance with aspects of the present disclosure. The device 405 may be an example of aspects of a user device as described herein. The device 405 may include an input module 410, an output module 415, and a wearable application 420. The device 405 may also include a processor. Each of these components may be in communication with one another (e.g., via one or more buses).

The input module 410 may provide a means for receiving information such as packets, user data, control information, or any combination thereof associated with various information channels (e.g., control channels, data channels, information channels related to illness detection techniques). Information may be passed on to other components of the device 405. The input module 410 may utilize a single antenna or a set of multiple antennas.

The output module 415 may provide a means for transmitting signals generated by other components of the device 405. For example, the output module 415 may transmit information such as packets, user data, control information, or any combination thereof associated with various information channels (e.g., control channels, data channels, information channels related to illness detection techniques). In some examples, the output module 415 may be co-located with the input module 410 in a transceiver module. The output module 415 may utilize a single antenna or a set of multiple antennas.

The wearable application 420, the input module 410, the output module 415, or various combinations thereof or various components thereof may be examples of means for performing various aspects of techniques for adaptive sensors of a wearable device as described herein. For example, the wearable application 420, the input module 410, the output module 415, or various combinations or components thereof may support a method for performing one or more of the functions described herein.

In some examples, the wearable application 420, the input module 410, the output module 415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the wearable application 420, the input module 410, the output module 415, or various combinations or components thereof may be implemented in code (e.g., as communications management software or firmware) executed by a processor. If implemented in code executed by a processor, the functions of the wearable application 420, the input module 410, the output module 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the wearable application 420 may be configured to perform various operations (e.g., receiving, monitoring, transmitting) using or otherwise in cooperation with the input module 410, the output module 415, or both. For example, the wearable application 420 may receive information from the input module 410, send information to the output module 415, or be integrated in combination with the input module 410, the output module 415, or both to receive information, transmit information, or perform various other operations as described herein.

For example, the wearable application 420 may be configured as or otherwise support a means for acquiring physiological data from a user via a plurality of optical channels of a wearable device, wherein each optical channel comprises a light-emitting component and a photodetector. The wearable application 420 may be configured as or otherwise support a means for determining respective measurement quality metrics and respective power consumption metrics associated with the plurality of optical channels based at least in part on the physiological data. The wearable application 420 may be configured as or otherwise support a means for selecting one or more optical channels of the plurality of optical channels of the wearable device based at least in part on a comparison of the respective measurement quality metrics and the respective power consumption metrics associated with the plurality of optical channels. The wearable application 420 may be configured as or otherwise support a means for acquiring additional physiological data using the one or more optical channels based at least in part on the selecting.

By including or configuring the wearable application 420 in accordance with examples as described herein, the device 405 (e.g., a processor controlling or otherwise coupled with the input module 410, the output module 415, the wearable application 420, or a combination thereof) may support techniques for adaptive optical channel selection which may result in reduced processing, reduced power consumption, and more efficient utilization of communication resources, among other advantages.

Figure 5:
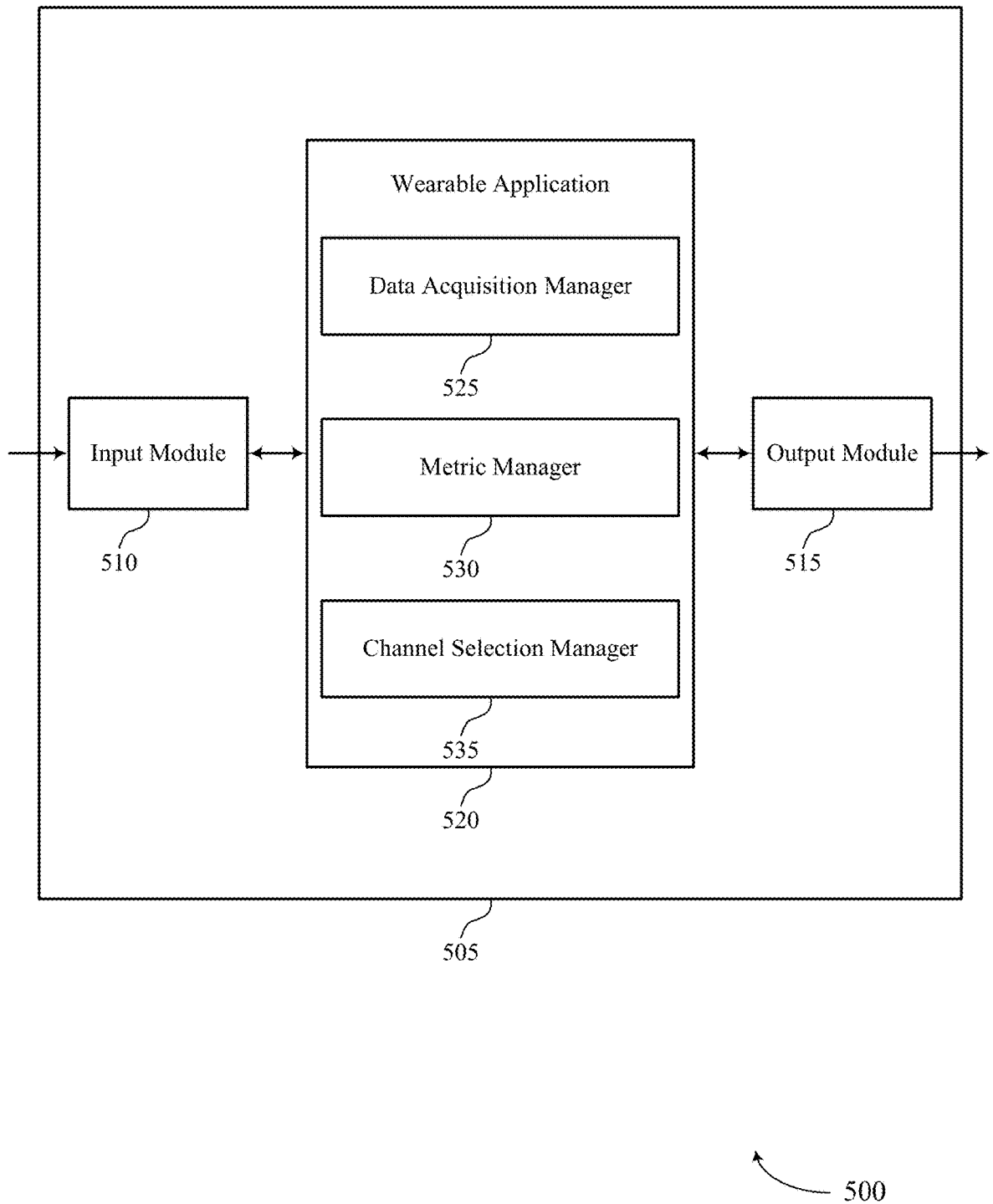

FIG. 5 shows a block diagram 500 of a device 505 that supports techniques for adaptive sensors of a wearable device in accordance with aspects of the present disclosure. The device 505 may be an example of aspects of a device 405 or a user device 115 as described herein. The device 505 may include an input module 510, an output module 515, and a wearable application 520. The device 505 may also include a processor. Each of these components may be in communication with one another (e.g., via one or more buses).

The input module 510 may provide a means for receiving information such as packets, user data, control information, or any combination thereof associated with various information channels (e.g., control channels, data channels, information channels related to illness detection techniques). Information may be passed on to other components of the device 505. The input module 510 may utilize a single antenna or a set of multiple antennas.

The output module 515 may provide a means for transmitting signals generated by other components of the device 505. For example, the output module 515 may transmit information such as packets, user data, control information, or any combination thereof associated with various information channels (e.g., control channels, data channels, information channels related to illness detection techniques). In some examples, the output module 515 may be co-located with the input module 510 in a transceiver module. The output module 515 may utilize a single antenna or a set of multiple antennas.

The device 505, or various components thereof, may be an example of means for performing various aspects of techniques for adaptive sensors of a wearable device as described herein. For example, the wearable application 520 may include a data acquisition manager 525, a metric manager 530, a channel selection manager 535, or any combination thereof. The wearable application 520 may be an example of aspects of a wearable application 420 as described herein. In some examples, the wearable application 520, or various components thereof, may be configured to perform various operations (e.g., receiving, monitoring, transmitting) using or otherwise in cooperation with the input module 510, the output module 515, or both. For example, the wearable application 520 may receive information from the input module 510, send information to the output module 515, or be integrated in combination with the input module 510, the output module 515, or both to receive information, transmit information, or perform various other operations as described herein.

The data acquisition manager 525 may be configured as or otherwise support a means for acquiring physiological data from a user via a plurality of optical channels of a wearable device, wherein each optical channel comprises a light-emitting component and a photodetector. The metric manager 530 may be configured as or otherwise support a means for determining respective measurement quality metrics and respective power consumption metrics associated with the plurality of optical channels based at least in part on the physiological data. The channel selection manager 535 may be configured as or otherwise support a means for selecting one or more optical channels of the plurality of optical channels of the wearable device based at least in part on a comparison of the respective measurement quality metrics and the respective power consumption metrics associated with the plurality of optical channels. The data acquisition manager 525 may be configured as or otherwise support a means for acquiring additional physiological data using the one or more optical channels based at least in part on the selecting.

Figure 6:
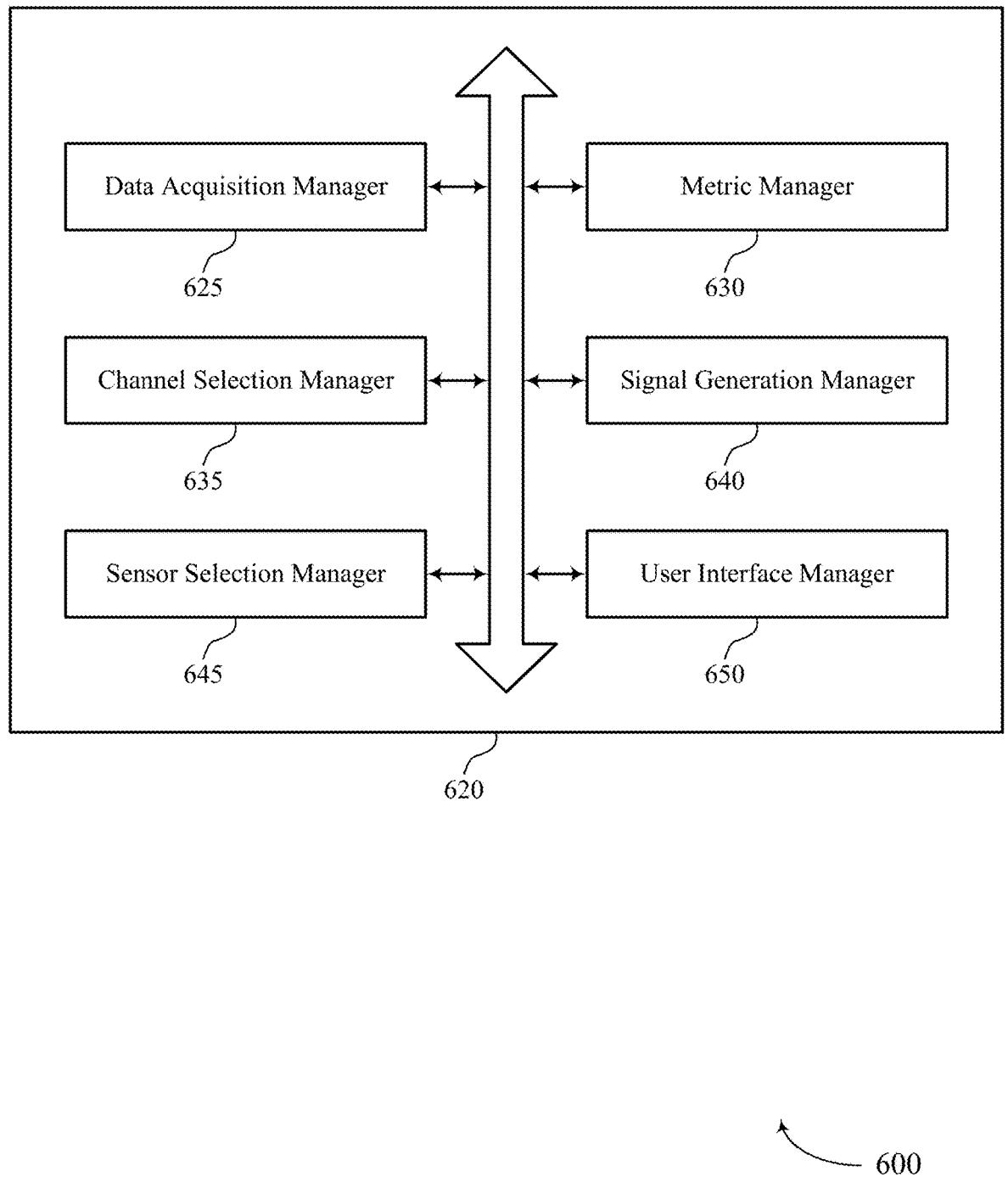
FIG. 6 shows a block diagram of a wearable application that supports techniques for adaptive sensors of a wearable device in accordance with aspects of the present disclosure.

FIG. 6 shows a block diagram 600 of a wearable application 620 that supports techniques for adaptive sensors of a wearable device in accordance with aspects of the present disclosure. The wearable application 620 may be an example of aspects of a wearable application 420, a wearable application 520, or both, as described herein. The wearable application 620, or various components thereof, may be an example of means for performing various aspects of techniques for adaptive sensors of a wearable device as described herein. For example, the wearable application 620 may include a data acquisition manager 625, a metric manager 630, a channel selection manager 635, a signal generation manager 640, a sensor selection manager 645, a user interface manager 650, or any combination thereof. Each of these components may communicate, directly or indirectly, with one another (e.g., via one or more buses).

The data acquisition manager 625 may be configured as or otherwise support a means for acquiring physiological data from a user via a plurality of optical channels of a wearable device, wherein each optical channel comprises a light-emitting component and a photodetector. The metric manager 630 may be configured as or otherwise support a means for determining respective measurement quality metrics and respective power consumption metrics associated with the plurality of optical channels based at least in part on the physiological data. The channel selection manager 635 may be configured as or otherwise support a means for selecting one or more optical channels of the plurality of optical channels of the wearable device based at least in part on a comparison of the respective measurement quality metrics and the respective power consumption metrics associated with the plurality of optical channels. In some examples, the data acquisition manager 625 may be configured as or otherwise support a means for acquiring additional physiological data using the one or more optical channels based at least in part on the selecting.

In some examples, the data acquisition manager 625 may be configured as or otherwise support a means for acquiring temperature data using one or more temperature sensors of the wearable device, wherein acquiring the physiological data via the plurality of optical channels, selecting the one or more optical channels, or both, is based at least in part on the temperature data.

In some examples, the channel selection manager 635 may be configured as or otherwise support a means for identifying a subset of optical channels from the plurality of optical channels based at least in part on the temperature data, wherein the physiological data is acquired using the subset of optical channels, and wherein the one or more optical channels are selected from the subset of optical channels.

In some examples, to support acquiring the temperature data, the data acquisition manager 625 may be configured as or otherwise support a means for acquiring first temperature data using a first temperature sensor. In some examples, to support acquiring the temperature data, the data acquisition manager 625 may be configured as or otherwise support a means for acquiring second temperature data using a second temperature sensor, wherein identifying the subset of optical channels, selecting the one or more optical channels, or both, is based at least in part on a comparison of the first temperature data and the second temperature data.

In some examples, the channel selection manager 635 may be configured as or otherwise support a means for selecting a first optical channel and a second optical channel from the plurality of optical channels. In some examples, the signal generation manager 640 may be configured as or otherwise support a means for generating a first signal based at least in part on first light transmitted along the first optical channel. In some examples, the signal generation manager 640 may be configured as or otherwise support a means for generating a second signal based at least in part on second light transmitted along the second optical channel, wherein the physiological data is based at least in part on the first signal and the second signal.

In some examples, the metric manager 630 may be configured as or otherwise support a means for determining a first power level associated with a first light-emitting component of the first optical channel based at least in part on a first measurement quality metric associated with the first optical channel, a first power consumption metric associated with the first optical channel, or both. In some examples, the metric manager 630 may be configured as or otherwise support a means for determining a second power level associated with a second light-emitting component of the second optical channel based at least in part on a second measurement quality metric associated with the second optical channel, a second power consumption metric associated with the second optical channel, or both, wherein the first signal and the second signal are based at least in part on the first power level and the second power level, respectively.

In some examples, the data acquisition manager 625 may be configured as or otherwise support a means for acquiring the physiological data using one or more pressure sensors of the wearable device, the physiological data comprising contact pressure data. In some examples, the sensor selection manager 645 may be configured as or otherwise support a means for selecting at least one pressure sensor of the one or more pressure sensors based at least in part on a measurement quality metric and a power consumption metric associated with the at least one pressure sensor. In some examples, the data acquisition manager 625 may be configured as or otherwise support a means for determining a heart rate measurement associated with the user based at least in part on the additional physiological data acquired using the one or more optical channels and additional contact pressure data acquired using the at least one pressure sensor.

In some examples, the contact pressure data, the additional contact pressure data, or both, is based at least in part on a constriction, a dilation, or both, of one or more blood vessels of the user.

In some examples, the channel selection manager 635 may be configured as or otherwise support a means for identifying a measurement configuration including a plurality of measurement occasions for testing the plurality of optical channels and a plurality of data collection intervals, the plurality of measurement occasions associated with a periodicity, wherein the physiological data is acquired during a first measurement occasion of the plurality of measurement occasions, and wherein the additional physiological data is acquired during a first data collection interval of the plurality of data collection intervals.

In some examples, the data acquisition manager 625 may be configured as or otherwise support a means for acquiring second physiological data from the user via the plurality of optical channels of the wearable device during a second measurement occasion of the plurality of measurement occasions and based at least in part on the periodicity. In some examples, the metric manager 630 may be configured as or otherwise support a means for determining respective additional measurement quality metrics and respective additional power consumption metrics associated with the plurality of optical channels based at least in part on the second physiological data. In some examples, the channel selection manager 635 may be configured as or otherwise support a means for selecting one or more additional optical channels of the plurality of optical channels of the wearable device based at least in part on a comparison of the respective additional measurement quality metrics and the respective additional power consumption metrics associated with the plurality of optical channels. In some examples, the data acquisition manager 625 may be configured as or otherwise support a means for acquiring third physiological data using the one or more additional optical channels during a second data collection interval of the plurality of data collection intervals.

In some examples, the wearable device comprises one or more photodetectors and one or more light-emitting apparatuses, wherein each light-emitting apparatus comprises a set of light-emitting components. In some examples, each optical channel of the plurality of optical channels comprises a photodetector selected from the one or more photodetectors, and a light-emitting component selected from a set of light-emitting components.

In some examples, each of set of light-emitting components comprises a first light-emitting component configured to emit light at a first wavelength, a second light-emitting component configured to emit light at a second wavelength, and a third light-emitting component configured to emit light at a third wavelength.

In some examples, the user interface manager 650 may be configured as or otherwise support a means for causing a graphical user interface of a user device associated with the wearable device to display an indication of the additional physiological data.

In some examples, the wearable device comprises a wearable ring device.

In some examples, the wearable ring device comprises a plurality of light-emitting components arranged at a first plurality of radial positions on an inner circumferential surface of the wearable ring device, and comprises a plurality of photodetectors arranged at a second plurality of radial positions on the inner circumferential surface of the wearable ring device. In some examples, each optical channel of the plurality of optical channels comprises a light-emitting component selected from the plurality of light-emitting components and a photodetector selected from the plurality of photodetectors.

In some examples, the wearable device collects the physiological data from the user based on arterial blood flow, capillary blood flow, arteriole blood flow, or a combination thereof.

In some examples, the data acquisition manager 625 may be configured as or otherwise support a means for acquiring the physiological data using one or more accelerometers of the wearable device, the physiological data comprising acceleration data. In some examples, the sensor selection manager 645 may be configured as or otherwise support a means for selecting at least one accelerometer of the one or more accelerometers based at least in part on a measurement quality metric and a power consumption metric associated with the at least one accelerometer. In some examples, the data acquisition manager 625 may be configured as or otherwise support a means for determining a level of skin contact associated with the user based at least in part on the additional physiological data acquired using the one or more optical channels and additional acceleration data acquired using the at least one accelerometer.

Figure 7:
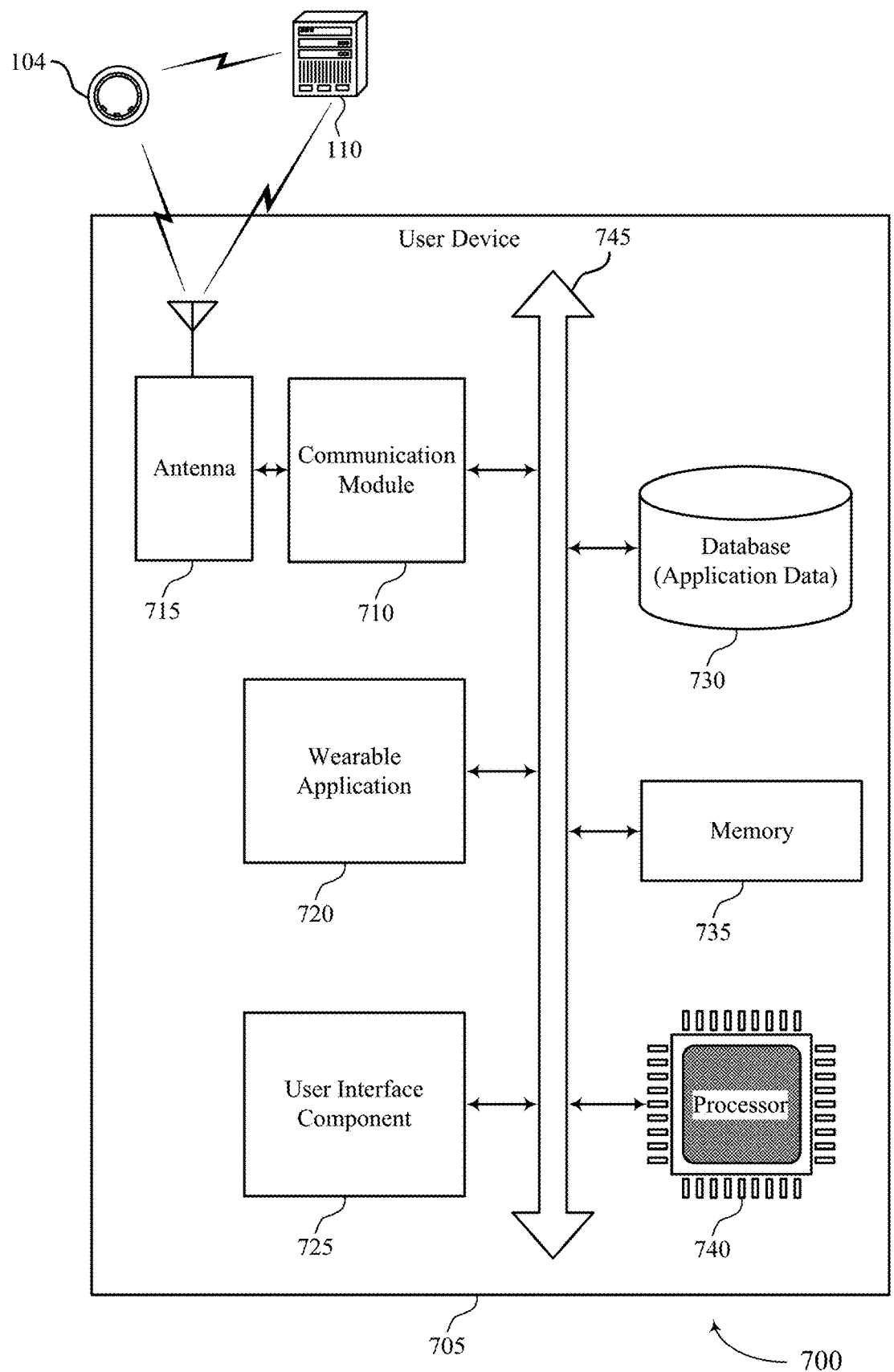
FIG. 7 shows a diagram of a system including a device that supports techniques for adaptive sensors of a wearable device in accordance with aspects of the present disclosure.

FIG. 7 shows a diagram of a system 700 including a device 705 that supports techniques for adaptive sensors of a wearable device in accordance with aspects of the present disclosure. The device 705 may be an example of or include the components of a device 405, a device 505, or a user device as described herein. The device 705 may include an example of a user device 106, as described previously herein. The device 705 may include components for bi-directional communications including components for transmitting and receiving communications with a wearable device 104 and a server 110, such as a wearable application 720, a communication module 710, an antenna 715, a user interface component 725, a database (application data) 730, a memory 735, and a processor 740. These components may be in electronic communication or otherwise coupled (e.g., operatively, communicatively, functionally, electronically, electrically) via one or more buses (e.g., a bus 745).

The communication module 710 may manage input and output signals for the device 705 via the antenna 715. The communication module 710 may include an example of the communication module 220-b of the user device 106 shown and described in FIG. 2. In this regard, the communication module 710 may manage communications with the ring 104 and the server 110, as illustrated in FIG. 2. The communication module 710 may also manage peripherals not integrated into the device 705. In some cases, the communication module 710 may represent a physical connection or port to an external peripheral. In some cases, the communication module 710 may utilize an operating system such as iOS®, ANDROID®, MS-DOS®, MS-WINDOWS®, OS/2®, UNIX®, LINUX®, or another known operating system. In other cases, the communication module 710 may represent or interact with a wearable device (e.g., ring 104), modem, a keyboard, a mouse, a touchscreen, or a similar device. In some cases, the communication module 710 may be implemented as part of the processor 740. In some examples, a user may interact with the device 705 via the communication module 710, user interface component 725, or via hardware components controlled by the communication module 710.

In some cases, the device 705 may include a single antenna 715. However, in some other cases, the device 705 may have more than one antenna 715, which may be capable of concurrently transmitting or receiving multiple wireless transmissions. The communication module 710 may communicate bi-directionally, via the one or more antennas 715, wired, or wireless links as described herein. For example, the communication module 710 may represent a wireless transceiver and may communicate bi-directionally with another wireless transceiver. The communication module 710 may also include a modem to modulate the packets, to provide the modulated packets to one or more antennas 715 for transmission, and to demodulate packets received from the one or more antennas 715.

The user interface component 725 may manage data storage and processing in a database 730. In some cases, a user may interact with the user interface component 725. In other cases, the user interface component 725 may operate automatically without user interaction. The database 730 may be an example of a single database, a distributed database, multiple distributed databases, a data store, a data lake, or an emergency backup database.

The memory 735 may include RAM and ROM. The memory 735 may store computer-readable, computer-executable software including instructions that, when executed, cause the processor 740 to perform various functions described herein. In some cases, the memory 735 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory 735 to perform various functions (e.g., functions or tasks supporting a method and system for sleep staging algorithms).

For example, the wearable application 720 may be configured as or otherwise support a means for acquiring physiological data from a user via a plurality of optical channels of a wearable device, wherein each optical channel comprises a light-emitting component and a photodetector. The wearable application 720 may be configured as or otherwise support a means for determining respective measurement quality metrics and respective power consumption metrics associated with the plurality of optical channels based at least in part on the physiological data. The wearable application 720 may be configured as or otherwise support a means for selecting one or more optical channels of the plurality of optical channels of the wearable device based at least in part on a comparison of the respective measurement quality metrics and the respective power consumption metrics associated with the plurality of optical channels. The wearable application 720 may be configured as or otherwise support a means for acquiring additional physiological data using the one or more optical channels based at least in part on the selecting.

By including or configuring the wearable application 720 in accordance with examples as described herein, the device 705 may support techniques for adaptive optical channel selection that may result in reduced latency, improved user experience related to reduced processing, reduced power consumption, more efficient utilization of communication resources, improved coordination between devices, longer battery life, and improved utilization of processing capability, among other advantages.

The wearable application 720 may include an application (e.g., "app"), program, software, or other component that is configured to facilitate communications with a ring 104, server 110, other user devices 106, and the like. For example, the wearable application 720 may include an application executable on a user device 106 that is configured to receive data (e.g., physiological data) from a ring 104, perform processing operations on the received data, transmit and receive data with the servers 110, and cause presentation of data to a user 102.

Figure 8:
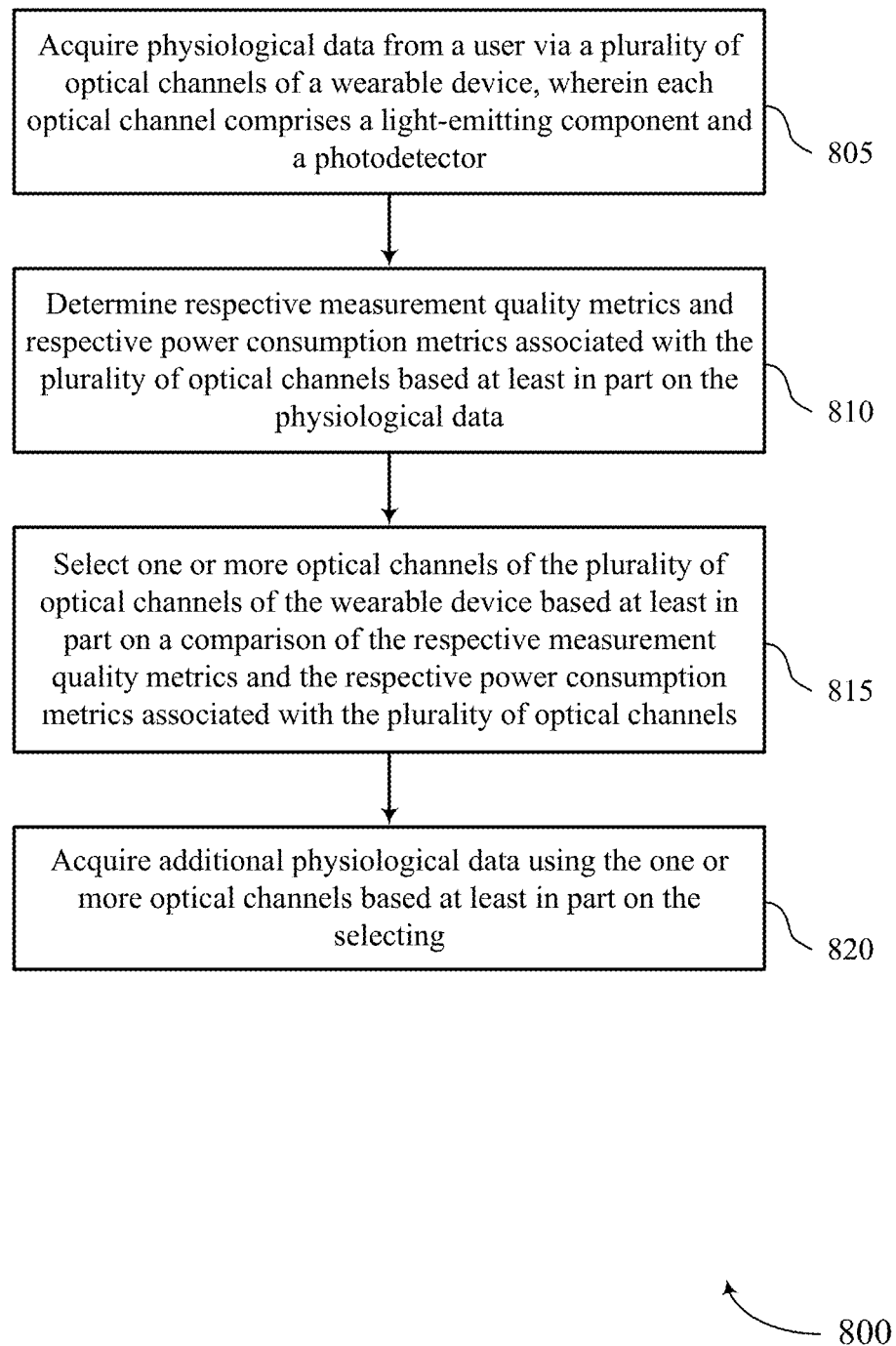
FIGS. 8 through 10 show flowcharts illustrating methods that support techniques for adaptive sensors of a wearable device in accordance with aspects of the present disclosure.

FIG. 8 shows a flowchart illustrating a method 800 that supports techniques for adaptive sensors of a wearable device in accordance with aspects of the present disclosure. The operations of the method 800 may be implemented by a user device or its components as described herein. For example, the operations of the method 800 may be performed by a user device as described with reference to FIGS. 1 through 7. In some examples, a user device may execute a set of instructions to control the functional elements of the user device to perform the described functions. Additionally, or alternatively, the user device may perform aspects of the described functions using special-purpose hardware.

At 805, the method may include acquiring physiological data from a user via a plurality of optical channels of a wearable device, wherein each optical channel comprises a light-emitting component and a photodetector. The operations of 805 may be performed in accordance with examples as disclosed herein. In some examples, aspects of the operations of 805 may be performed by a data acquisition manager 625 as described with reference to FIG. 6.

At 810, the method may include determining respective measurement quality metrics and respective power consumption metrics associated with the plurality of optical channels based at least in part on the physiological data. The operations of 810 may be performed in accordance with examples as disclosed herein. In some examples, aspects of the operations of 810 may be performed by a metric manager 630 as described with reference to FIG. 6.

At 815, the method may include selecting one or more optical channels of the plurality of optical channels of the wearable device based at least in part on a comparison of the respective measurement quality metrics and the respective power consumption metrics associated with the plurality of optical channels. The operations of 815 may be performed in accordance with examples as disclosed herein. In some examples, aspects of the operations of 815 may be performed by a channel selection manager 635 as described with reference to FIG. 6.

At 820, the method may include acquiring additional physiological data using the one or more optical channels based at least in part on the selecting. The operations of 820 may be performed in accordance with examples as disclosed herein. In some examples, aspects of the operations of 820 may be performed by a data acquisition manager 625 as described with reference to FIG. 6.

Figure 9:
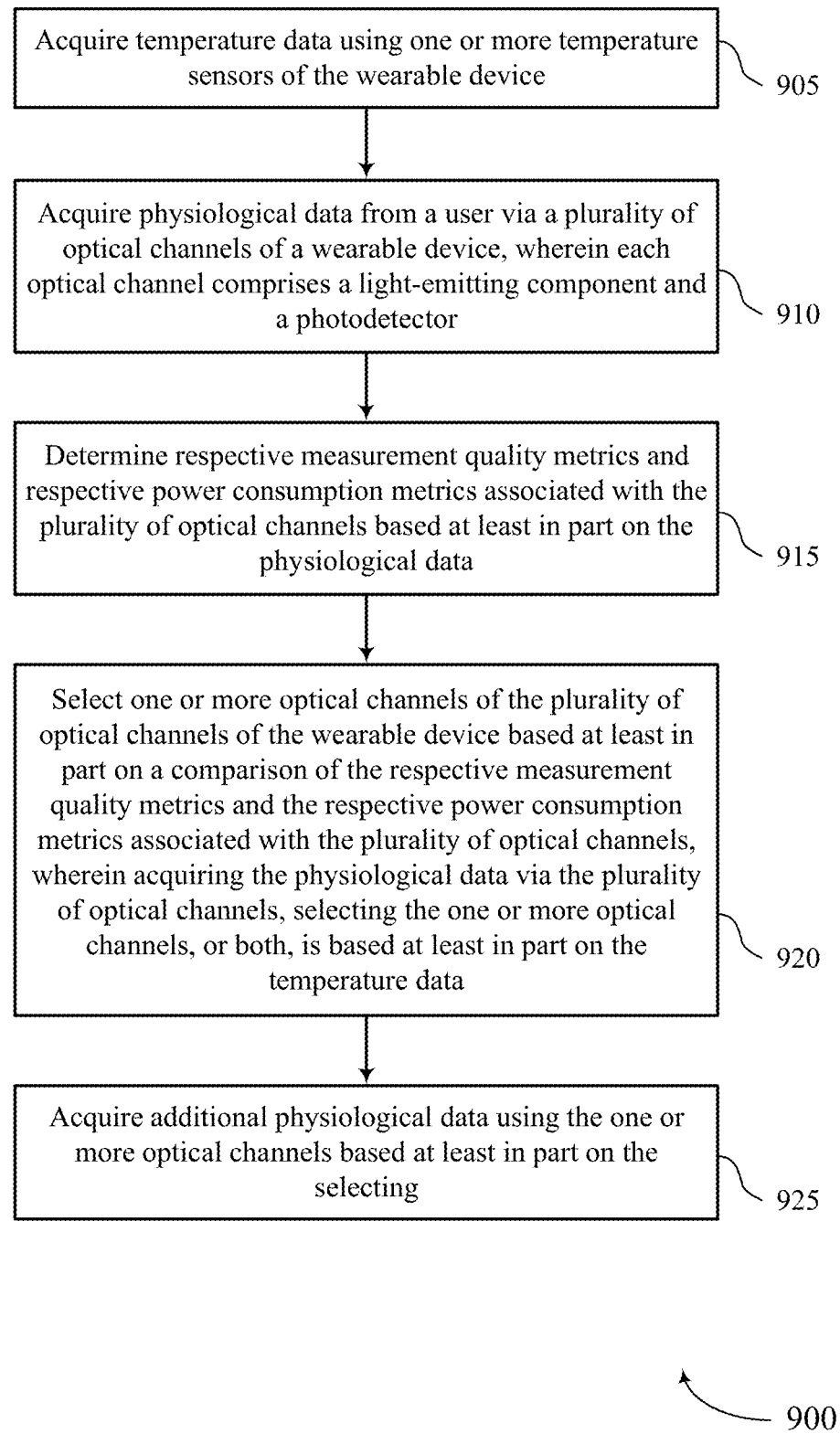

FIG. 9 shows a flowchart illustrating a method 900 that supports techniques for adaptive sensors of a wearable device in accordance with aspects of the present disclosure. The operations of the method 900 may be implemented by a user device or its components as described herein. For example, the operations of the method 900 may be performed by a user device as described with reference to FIGS. 1 through 7. In some examples, a user device may execute a set of instructions to control the functional elements of the user device to perform the described functions. Additionally, or alternatively, the user device may perform aspects of the described functions using special-purpose hardware.

At 905, the method may include acquiring temperature data using one or more temperature sensors of the wearable device. The operations of 905 may be performed in accordance with examples as disclosed herein. In some examples, aspects of the operations of 905 may be performed by a data acquisition manager 625 as described with reference to FIG. 6.

At 910, the method may include acquiring physiological data from a user via a plurality of optical channels of a wearable device, wherein each optical channel comprises a light-emitting component and a photodetector. The operations of 910 may be performed in accordance with examples as disclosed herein. In some examples, aspects of the operations of 910 may be performed by a data acquisition manager 625 as described with reference to FIG. 6.

At 915, the method may include determining respective measurement quality metrics and respective power consumption metrics associated with the plurality of optical channels based at least in part on the physiological data. The operations of 915 may be performed in accordance with examples as disclosed herein. In some examples, aspects of the operations of 915 may be performed by a metric manager 630 as described with reference to FIG. 6.

At 920, the method may include selecting one or more optical channels of the plurality of optical channels of the wearable device based at least in part on a comparison of the respective measurement quality metrics and the respective power consumption metrics associated with the plurality of optical channels, wherein acquiring the physiological data via the plurality of optical channels, selecting the one or more optical channels, or both, is based at least in part on the temperature data. The operations of 920 may be performed in accordance with examples as disclosed herein. In some examples, aspects of the operations of 920 may be performed by a channel selection manager 635 as described with reference to FIG. 6.

At 925, the method may include acquiring additional physiological data using the one or more optical channels based at least in part on the selecting. The operations of 925 may be performed in accordance with examples as disclosed herein. In some examples, aspects of the operations of 925 may be performed by a data acquisition manager 625 as described with reference to FIG. 6.

Figure 10:
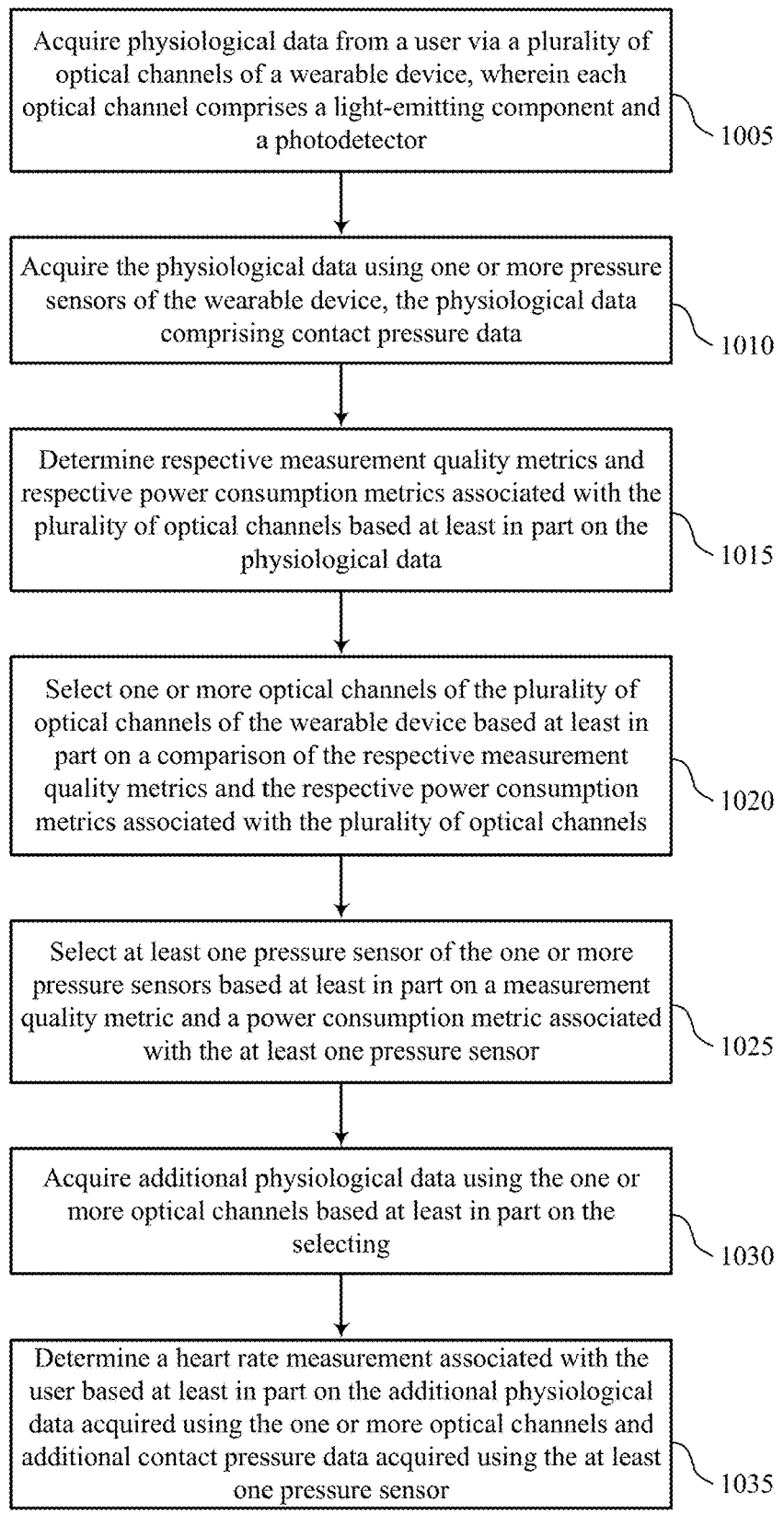

FIG. 10 shows a flowchart illustrating a method 1000 that supports techniques for adaptive sensors of a wearable device in accordance with aspects of the present disclosure. The operations of the method 1000 may be implemented by a user device or its components as described herein. For example, the operations of the method 1000 may be performed by a user device as described with reference to FIGS. 1 through 7. In some examples, a user device may execute a set of instructions to control the functional elements of the user device to perform the described functions. Additionally, or alternatively, the user device may perform aspects of the described functions using special-purpose hardware.

At 1005, the method may include acquiring physiological data from a user via a plurality of optical channels of a wearable device, wherein each optical channel comprises a light-emitting component and a photodetector. The operations of 1005 may be performed in accordance with examples as disclosed herein. In some examples, aspects of the operations of 1005 may be performed by a data acquisition manager 625 as described with reference to FIG. 6.

At 1010, the method may include acquiring the physiological data using one or more pressure sensors of the wearable device, the physiological data comprising contact pressure data. The operations of 1010 may be performed in accordance with examples as disclosed herein. In some examples, aspects of the operations of 1010 may be performed by a data acquisition manager 625 as described with reference to FIG. 6.

At 1015, the method may include determining respective measurement quality metrics and respective power consumption metrics associated with the plurality of optical channels based at least in part on the physiological data. The operations of 1015 may be performed in accordance with examples as disclosed herein. In some examples, aspects of the operations of 1015 may be performed by a metric manager 630 as described with reference to FIG. 6.

At 1020, the method may include selecting one or more optical channels of the plurality of optical channels of the wearable device based at least in part on a comparison of the respective measurement quality metrics and the respective power consumption metrics associated with the plurality of optical channels. The operations of 1020 may be performed in accordance with examples as disclosed herein. In some examples, aspects of the operations of 1020 may be performed by a channel selection manager 635 as described with reference to FIG. 6.

At 1025, the method may include selecting at least one pressure sensor of the one or more pressure sensors based at least in part on a measurement quality metric and a power consumption metric associated with the at least one accelerometer. The operations of 1025 may be performed in accordance with examples as disclosed herein. In some examples, aspects of the operations of 1025 may be performed by a sensor selection manager 645 as described with reference to FIG. 6.

At 1030, the method may include acquiring additional physiological data using the one or more optical channels based at least in part on the selecting. The operations of 1030 may be performed in accordance with examples as disclosed herein. In some examples, aspects of the operations of 1030 may be performed by a data acquisition manager 625 as described with reference to FIG. 6.

At 1035, the method may include determining a heart rate measurement associated with the user based at least in part on the additional physiological data acquired using the one or more optical channels and additional contact pressure data acquired using the at least one pressure sensor. The operations of 1035 may be performed in accordance with examples as disclosed herein. In some examples, aspects of the operations of 1035 may be performed by a data acquisition manager 625 as described with reference to FIG. 6.

It should be noted that the methods described above describe possible implementations, and that the operations and the steps may be rearranged or otherwise modified and that other implementations are possible. Furthermore, aspects from two or more of the methods may be combined.

A method is described. The method may include acquiring physiological data from a user via a plurality of optical channels of a wearable device, wherein each optical channel comprises a light-emitting component and a photodetector, determining respective measurement quality metrics and respective power consumption metrics associated with the plurality of optical channels based at least in part on the physiological data, selecting one or more optical channels of the plurality of optical channels of the wearable device based at least in part on a comparison of the respective measurement quality metrics and the respective power consumption metrics associated with the plurality of optical channels, and acquiring additional physiological data using the one or more optical channels based at least in part on the selecting.

An apparatus is described. The apparatus may include a processor, memory coupled with the processor, and instructions stored in the memory. The instructions may be executable by the processor to cause the apparatus to acquire physiological data from a user via a plurality of optical channels of a wearable device, wherein each optical channel comprises a light-emitting component and a photodetector, determine respective measurement quality metrics and respective power consumption metrics associated with the plurality of optical channels based at least in part on the physiological data, select one or more optical channels of the plurality of optical channels of the wearable device based at least in part on a comparison of the respective measurement quality metrics and the respective power consumption metrics associated with the plurality of optical channels, and acquire additional physiological data using the one or more optical channels based at least in part on the selecting.

Another apparatus is described. The apparatus may include means for acquiring physiological data from a user via a plurality of optical channels of a wearable device, wherein each optical channel comprises a light-emitting component and a photodetector, means for determining respective measurement quality metrics and respective power consumption metrics associated with the plurality of optical channels based at least in part on the physiological data, means for selecting one or more optical channels of the plurality of optical channels of the wearable device based at least in part on a comparison of the respective measurement quality metrics and the respective power consumption metrics associated with the plurality of optical channels, and means for acquiring additional physiological data using the one or more optical channels based at least in part on the selecting.

A non-transitory computer-readable medium storing code is described. The code may include instructions executable by a processor to acquire physiological data from a user via a plurality of optical channels of a wearable device, wherein each optical channel comprises a light-emitting component and a photodetector, determine respective measurement quality metrics and respective power consumption metrics associated with the plurality of optical channels based at least in part on the physiological data, select one or more optical channels of the plurality of optical channels of the wearable device based at least in part on a comparison of the respective measurement quality metrics and the respective power consumption metrics associated with the plurality of optical channels, and acquire additional physiological data using the one or more optical channels based at least in part on the selecting.

Some examples of the method, apparatuses, and non-transitory computer-readable medium described herein may further include operations, features, means, or instructions for acquiring temperature data using one or more temperature sensors of the wearable device, wherein acquiring the physiological data via the plurality of optical channels, selecting the one or more optical channels, or both, may be based at least in part on the temperature data.

Some examples of the method, apparatuses, and non-transitory computer-readable medium described herein may further include operations, features, means, or instructions for identifying a subset of optical channels from the plurality of optical channels based at least in part on the temperature data, wherein the physiological data may be acquired using the subset of optical channels, and wherein the one or more optical channels may be selected from the subset of optical channels.

In some examples of the method, apparatuses, and non-transitory computer-readable medium described herein, acquiring the temperature data may include operations, features, means, or instructions for acquiring first temperature data using a first temperature sensor and acquiring second temperature data using a second temperature sensor, wherein identifying the subset of optical channels, selecting the one or more optical channels, or both, may be based at least in part on a comparison of the first temperature data and the second temperature data.

Some examples of the method, apparatuses, and non-transitory computer-readable medium described herein may further include operations, features, means, or instructions for selecting a first optical channel and a second optical channel from the plurality of optical channels, generating a first signal based at least in part on first light transmitted along the first optical channel, and generating a second signal based at least in part on second light transmitted along the second optical channel, wherein the physiological data may be based at least in part on the first signal and the second signal.

Some examples of the method, apparatuses, and non-transitory computer-readable medium described herein may further include operations, features, means, or instructions for determining a first power level associated with a first light-emitting component of the first optical channel based at least in part on a first measurement quality metric associated with the first optical channel, a first power consumption metric associated with the first optical channel, or both and determining a second power level associated with a second light-emitting component of the second optical channel based at least in part on a second measurement quality metric associated with the second optical channel, a second power consumption metric associated with the second optical channel, or both, wherein the first signal and the second signal may be based at least in part on the first power level and the second power level, respectively.

Some examples of the method, apparatuses, and non-transitory computer-readable medium described herein may further include operations, features, means, or instructions for acquiring the physiological data using one or more pressure sensors of the wearable device, the physiological data comprising contact pressure data, selecting at least one pressure sensor of the one or more pressure sensors based at least in part on a measurement quality metric and a power consumption metric associated with the at least one pressure sensor, and determining a heart rate measurement associated with the user based at least in part on the additional physiological data acquired using the one or more optical channels and additional contact pressure data acquired using the at least one pressure sensors.

In some examples of the method, apparatuses, and non-transitory computer-readable medium described herein, the contact pressure data, the additional contact pressure data, or both, may be based at least in part on a constriction, a dilation, or both, of one or more blood vessels of the user.

Some examples of the method, apparatuses, and non-transitory computer-readable medium described herein may further include operations, features, means, or instructions for identifying a measurement configuration including a plurality of measurement occasions for testing the plurality of optical channels and a plurality of data collection intervals, the plurality of measurement occasions associated with a periodicity, wherein the physiological data may be acquired during a first measurement occasion of the plurality of measurement occasions, and wherein the additional physiological data may be acquired during a first data collection interval of the plurality of data collection intervals.

Some examples of the method, apparatuses, and non-transitory computer-readable medium described herein may further include operations, features, means, or instructions for acquiring second physiological data from the user via the plurality of optical channels of the wearable device during a second measurement occasion of the plurality of measurement occasions and based at least in part on the periodicity, determining respective additional measurement quality metrics and respective additional power consumption metrics associated with the plurality of optical channels based at least in part on the second physiological data, selecting one or more additional optical channels of the plurality of optical channels of the wearable device based at least in part on a comparison of the respective additional measurement quality metrics and the respective additional power consumption metrics associated with the plurality of optical channels, and acquiring third physiological data using the one or more additional optical channels during a second data collection interval of the plurality of data collection intervals.

In some examples of the method, apparatuses, and non-transitory computer-readable medium described herein, the wearable device comprises one or more photodetectors and one or more light-emitting apparatuses, where each light-emitting apparatus comprises a set of light-emitting components, and each optical channel of the plurality of optical channels comprises a photodetector selected from the one or more photodetectors, and a light-emitting component selected from a set of light-emitting components.

In some examples of the method, apparatuses, and non-transitory computer-readable medium described herein, each of the first set of three light-emitting components and the second set of three light-emitting components comprises a first light-emitting component configured to emit green light, a second light-emitting component configured to emit red light, and a third light-emitting component configured to emit infrared light.

Some examples of the method, apparatuses, and non-transitory computer-readable medium described herein may further include operations, features, means, or instructions for causing a graphical user interface of a user device associated with the wearable device to display an indication of the additional physiological data.

In some examples of the method, apparatuses, and non-transitory computer-readable medium described herein, the wearable device comprises a wearable ring device.

In some examples of the method, apparatuses, and non-transitory computer-readable medium described herein, the wearable ring device comprises a plurality of light-emitting components arranged at a first plurality of radial positions on an inner circumferential surface of the wearable ring device, and comprises a plurality of photodetectors arranged at a second plurality of radial positions on the inner circumferential surface of the wearable ring device and each optical channel of the plurality of optical channels comprises a light-emitting component selected from the plurality of light-emitting components and a photodetector selected from the plurality of photodetectors.

In some examples of the method, apparatuses, and non-transitory computer-readable medium described herein, the wearable device collects the physiological data from the user based on arterial blood flow, capillary blood flow, arteriole blood flow, or a combination thereof.

Some examples of the method, apparatuses, and non-transitory computer-readable medium described herein may further include operations, features, means, or instructions for acquiring the physiological data using one or more accelerometers of the wearable device, the physiological data comprising acceleration data, selecting at least one accelerometer of the one or more accelerometers based at least in part on a measurement quality metric and a power consumption metric associated with the at least one accelerometer, and determining a level of skin contact associated with the user based at least in part on the additional physiological data acquired using the one or more optical channels and additional acceleration data acquired using the at least one pressure accelerometer.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
   acquiring physiological data from a user via a plurality of optical channels of a wearable device, wherein each optical channel comprises a light-emitting component and a photodetector;
   determining respective measurement quality metrics and respective power consumption metrics associated with the plurality of optical channels based at least in part on the physiological data;
   selecting one or more optical channels of the plurality of optical channels of the wearable device based at least in part on a comparison of the respective measurement quality metrics and the respective power consumption metrics associated with the plurality of optical channels; and
   acquiring additional physiological data using the one or more optical channels based at least in part on the selecting.

2. The method of claim 1, further comprising:
   acquiring temperature data using one or more temperature sensors of the wearable device, wherein acquiring the physiological data via the plurality of optical channels, selecting the one or more optical channels, or both, is based at least in part on the temperature data.

3. The method of claim 2, further comprising:
   identifying a subset of optical channels from the plurality of optical channels based at least in part on the temperature data, wherein the physiological data is acquired using the subset of optical channels, and wherein the one or more optical channels are selected from the subset of optical channels.

4. The method of claim 3, wherein acquiring the temperature data comprises:
   acquiring first temperature data using a first temperature sensor; and
   acquiring second temperature data using a second temperature sensor, wherein identifying the subset of optical channels, selecting the one or more optical channels, or both, is based at least in part on a comparison of the first temperature data and the second temperature data.

5. The method of claim 1, further comprising:
   selecting a first optical channel and a second optical channel from the plurality of optical channels;
   generating a first signal based at least in part on first light transmitted along the first optical channel; and
   generating a second signal based at least in part on second light transmitted along the second optical channel, wherein the physiological data is based at least in part on the first signal and the second signal.

6. The method of claim 5, further comprising:
   determining a first power level associated with a first light-emitting component of the first optical channel based at least in part on a first measurement quality metric associated with the first optical channel, a first power consumption metric associated with the first optical channel, or both; and
   determining a second power level associated with a second light-emitting component of the second optical channel based at least in part on a second measurement quality metric associated with the second optical channel, a second power consumption metric associated with the second optical channel, or both, wherein the first signal and the second signal are based at least in part on the first power level and the second power level, respectively.

7. The method of claim 1, further comprising:
   acquiring the physiological data using one or more pressure sensors of the wearable device, the physiological data comprising contact pressure data;
   selecting at least one pressure sensor of the one or more pressure sensors based at least in part on a measurement quality metric and a power consumption metric associated with the at least one pressure sensor; and
   determining a heart rate measurement associated with the user based at least in part on the additional physiological data acquired using the one or more optical channels and additional contact pressure data acquired using the at least one pressure sensor.

8. The method of claim 7, wherein the contact pressure data, the additional contact pressure data, or both, is based at least in part on a constriction, a dilation, or both, of one or more blood vessels of the user.

9. The method of claim 1, further comprising:
   identifying a measurement configuration including a plurality of measurement occasions for testing the plurality of optical channels and a plurality of data collection intervals, the plurality of measurement occasions associated with a periodicity, wherein the physiological data is acquired during a first measurement occasion of the plurality of measurement occasions, and wherein the additional physiological data is acquired during a first data collection interval of the plurality of data collection intervals.

10. The method of claim 9, further comprising:
    acquiring second physiological data from the user via the plurality of optical channels of the wearable device during a second measurement occasion of the plurality of measurement occasions and based at least in part on the periodicity;
    determining respective additional measurement quality metrics and respective additional power consumption metrics associated with the plurality of optical channels based at least in part on the second physiological data;
    selecting one or more additional optical channels of the plurality of optical channels of the wearable device based at least in part on a comparison of the respective additional measurement quality metrics and the respective additional power consumption metrics associated with the plurality of optical channels; and
    acquiring third physiological data using the one or more additional optical channels during a second data collection interval of the plurality of data collection intervals.

11. The method of claim 1, wherein the wearable device comprises one or more photodetectors and one or more light-emitting apparatuses, wherein each light-emitting apparatus comprises a set of light-emitting components, and wherein each optical channel of the plurality of optical channels comprises a photodetector selected from the one or more photodetectors, and a light-emitting component selected from the set of light-emitting components.

12. The method of claim 11, wherein each set of light-emitting components comprises a first light-emitting component configured to emit light associated with a first wavelength, a second light-emitting component configured to emit light associated with a second wavelength, and a third light-emitting component configured to emit light associated with a third wavelength.

13. The method of claim 1, further comprising:
    causing a graphical user interface of a user device associated with the wearable device to display an indication of the additional physiological data.

14. The method of claim 1, wherein the wearable device comprises a wearable ring device.

15. The method of claim 14, wherein the wearable ring device comprises a plurality of light-emitting components arranged at a first plurality of radial positions on an inner circumferential surface of the wearable ring device, and comprises a plurality of photodetectors arranged at a second plurality of radial positions on the inner circumferential surface of the wearable ring device, and wherein each optical channel of the plurality of optical channels comprises a light-emitting component selected from the plurality of light-emitting components and a photodetector selected from the plurality of photodetectors.

16. The method of claim 1, wherein the wearable device collects the physiological data from the user based on arterial blood flow, capillary blood flow, arteriole blood flow, or a combination thereof.

17. The method of claim 1, further comprising:
- acquiring the physiological data using one or more accelerometers of the wearable device, the physiological data comprising acceleration data;
- selecting at least one accelerometer of the one or more accelerometers based at least in part on a measurement quality metric and a power consumption metric associated with the at least one accelerometer; and
- determining a level of skin contact associated with the user based at least in part on the additional physiological data acquired using the one or more optical channels and additional acceleration data acquired using the at least one accelerometer.

* * * * *